(12) United States Patent
Okubo et al.

(10) Patent No.: US 10,456,828 B2
(45) Date of Patent: Oct. 29, 2019

(54) METHOD FOR PRODUCING FORGED CRANKSHAFT

(71) Applicant: NIPPON STEEL & SUMITOMO METAL CORPORATiON, Tokyo (JP)

(72) Inventors: Junichi Okubo, Amagasaki (JP); Kenji Tamura, Takatsuki (JP); Kunihiro Yoshida, Nishinomiya (JP); Samsoo Hwang, Nishinomiya (JP); Ryusuke Nakano, Nishinomiya (JP); Masao Hori, Matsubara (JP)

(73) Assignee: NIPPON STEEL CORPORATION, Tokyo (JP)

( * ) Notice: Subject to any disclaimer, the term of this patent is extended or adjusted under 35 U.S.C. 154(b) by 225 days.

(21) Appl. No.: 15/554,014

(22) PCT Filed: Mar. 18, 2016

(86) PCT No.: PCT/JP2016/001598
§ 371 (c)(1),
(2) Date: Aug. 28, 2017

(87) PCT Pub. No.: WO2016/147674
PCT Pub. Date: Sep. 22, 2016

(65) Prior Publication Data
US 2018/0071813 A1 Mar. 15, 2018

(30) Foreign Application Priority Data

Mar. 18, 2015 (JP) .................................. 2015-055450
Sep. 28, 2015 (JP) .................................. 2015-189875

(51) Int. Cl.
*B21K 1/08* (2006.01)
*B21J 5/02* (2006.01)
*F16C 3/08* (2006.01)

(52) U.S. Cl.
CPC .................................... *B21K 1/08* (2013.01);
*B21J 5/02* (2013.01); *B21J 5/022* (2013.01);
*F16C 3/08* (2013.01);
(Continued)

(58) Field of Classification Search
CPC ....... B21J 9/00; B21J 5/022; B21J 5/02; B21J 5/12; B21K 1/08; F16C 3/08;
(Continued)

(56) References Cited

U.S. PATENT DOCUMENTS 9,707,618 B2 * 7/2017 Okubo ..................... B21K 1/08

FOREIGN PATENT DOCUMENTS

JP 02-255240 10/1990
JP 10-029032 2/1998
(Continued)

*Primary Examiner* — David P Bryant
*Assistant Examiner* — Christine Pellazar Bersabal
(74) *Attorney, Agent, or Firm* — Clark & Brody

(57) ABSTRACT

A forged crankshaft production method includes a first preforming step, a second preforming step, and a final preforming step. The first pair of dies includes web processing parts to come into contact with portions to be formed into arms and portions to be formed into weights integrated with the arms. Each of the web processing parts includes an arm processing part and a weight processing part. The arm processing part and the weight processing part form a recessed portion, and the width of the open side of the weight processing part becomes greater with increasing distance from the bottom of the recessed portion. Accordingly, in the blank, volume can be distributed between a portion to be formed into an arm and a portion to be formed into a weight integrated with the arm, and the material yield rate can be improved.

8 Claims, 16 Drawing Sheets

(52) U.S. Cl.
CPC ...... *F16C 2220/40* (2013.01); *F16C 2220/46* (2013.01); *F16C 2360/22* (2013.01)

(58) Field of Classification Search
CPC .............. F16C 2220/40; F16C 2220/46; F16C 2360/22; B23P 15/00; B23P 2700/07; B21D 53/04
See application file for complete search history.

(56) References Cited

FOREIGN PATENT DOCUMENTS

| | | |
|---|---|---|
| JP | 2001-105087 | 4/2001 |
| WO | 2014/038183 | 3/2014 |

\* cited by examiner

IB-IB

VIIA-VIIA

VIIB-VIIB

IXA-IXA

XA-XA

XIA-XIA

XVIIIA-XVIIIA

XVIIIB-XVIIIB

XIXA-XIXA

XIXB-XIXB

XXIA-XXIA

XXIB-XXIB

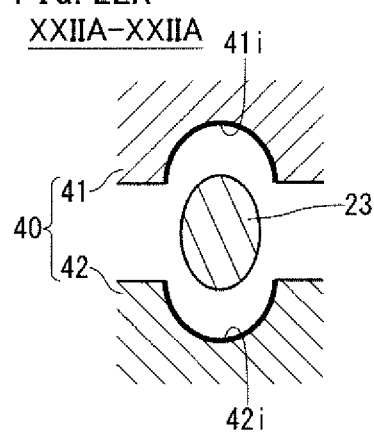
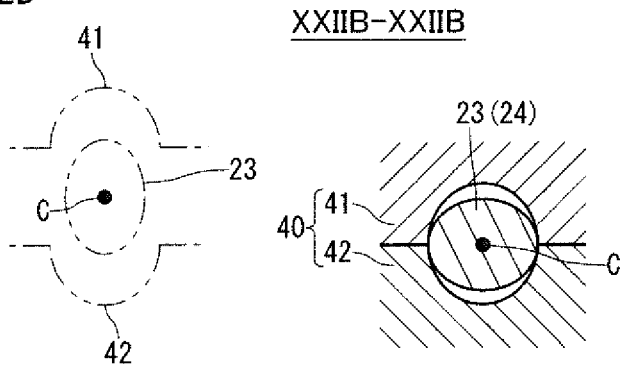

METHOD FOR PRODUCING FORGED CRANKSHAFT

TECHNICAL FIELD

The present invention relates to a method for producing a crankshaft by hot forging.

BACKGROUND ART

A reciprocating engine to be employed in a motor vehicle, a motorcycle, an agricultural machine, a marine vessel or the like requires a crankshaft to extract power by converting reciprocating motions of pistons to rotational motion. There are two types of crankshafts: the type manufactured by die forging and the type manufactured by casting. Especially when high strength and high stiffness are required, die forged crankshafts (which will hereinafter be referred to as "forged crankshafts") are often employed.

FIGS. 1A and 1B are schematic diagrams showing an example of a shape of a commonly used crankshaft. FIG. 1A is an overall view, and FIG. 1B is a sectional view along the line IB-IB. In order to facilitate understanding of the shape of the crankshaft, FIG. 1B shows only a crank arm A7, a counterweight W7 integrated with the crank arm A7, a pin P4 and a journal J4 connected to the crank arm A7, which are extracted from the crankshaft.

The crankshaft 11 shown in FIGS. 1A and 1B is a four-cylinder eight-counterweight crankshaft to be mounted in a four-cylinder engine. The crankshaft 11 includes five journals J1 to J5, four pins P1 to P4, a front part Fr, a flange Fl, and eight crank arms (hereinafter referred to simply as "arms") A1 to A8. The eight arms A1 to A8 connect the journals J1 to J5 respectively to the pins P1 to P4. The eight arms (all of the arms) A1 to A8 have counterweights (hereinafter referred to simply as "weights") W1 to W8, which are integrally formed with the arms A1 to A8, respectively. The front part Fr is located at a front end of the crankshaft 11, and the flange Fl is located at a rear end of the crank shaft 1, the front end and the rear end being ends in a direction along the axis of the crankshaft 11. The front part Fr is connected to the front first journal J1, and the flange Fl is connected to the rearmost fifth journal J5.

In the following paragraphs, when the journals J1 to J5, the pins P1 to P4, the arms A1 to A8, and the weights W1 to W8 are each collectively referred to, a reference character "J" is used for the journals, a reference character "P" for the pins, a reference character "A" for the arms, and a reference character "W" for the weights. An arm A and a weight W integrated therewith are referred to collectively as a "web".

As shown in FIG. 1B, the width Bw of the weights W is greater than the width Ba of the arms A. Accordingly, each of the weights W bulges greatly from an arm center plane (a plane including the axis of the pin P and the axis of the journal J).

A forged crankshaft having such a shape is generally produced by using a billet as a starting material. A section of the billet in a direction perpendicular to the longitudinal direction thereof, that is, a cross section of the billet is circular or square, and the cross-sectional area is constant throughout the length. In the following paragraphs, a section of a crankshaft in a direction perpendicular to the axis of the crankshaft is referred to as a "cross section", and a section of the crankshaft in a direction parallel to the axis of the crankshaft is referred to as a "longitudinal section". The area of the cross section is referred to simply as a "sectional area". A method for producing a forged crankshaft includes a preforming step, a die forging step, and a trimming step that are to be executed in this order. After the trimming step, a coining step may be executed if needed. Typically, the preforming step includes a rolling step and a bending step, and the die forging step includes a rough forging step and a finish forging step.

FIGS. 2A to 2F are schematic diagrams showing a conventional method for producing a common forged crankshaft. FIG. 2A shows a billet, FIG. 2B shows a rolled blank, FIG. 2C shows a bent blank, FIG. 2D shows a rough forged blank, FIG. 2E shows a finish forged blank, and FIG. 2F shows a forged crankshaft. FIGS. 2A to 2F show a method for producing a crankshaft having the configuration shown in FIGS. 1A and 1B.

In the production method shown in FIGS. 2A to 2F, a forged crankshaft 11 is produced as follows. First, a billet 12 with a specified length as shown in FIG. 2A is heated in a heating furnace, and in a preforming step, the heated billet is rolled and subsequently bent. In the rolling, the billet 12 is rolled and reduced, for example, by grooved rolls. This is to distribute the volume of the billet 12 in the axial direction, and thereby, a rolled blank 13, which is an in-process material, is obtained (see FIG. 2B). Next, in the bending, the rolled blank 13 is partly pressed and reduced from a direction perpendicular to the axial direction. This is to distribute the volume of the rolled blank 13, and thereby, a bent blank 14, which is a next in-process material, is obtained (see FIG. 2C).

Next, in a rough forging step, the bent blank 14 is forged by a pair of an upper die and a lower die, and thereby, a rough forged blank 15 is obtained (see FIG. 2D). The rough forged blank 15 is roughly in the shape of the crankshaft (final product). In the finish forging step, the rough forged blank 15 is forged by a pair of an upper die and a lower die, and thereby, a finish forged blank 16 is obtained (see FIG. 2E). The finish forged blank 16 has a shape in agreement with the shape of the final product, that is, the crankshaft. During the rough forging and the finish forging, excess material flows out through a space between the mutually facing parting faces of the dies, which results in formation of flash B. Accordingly, the rough forged blank 15 and the finish forged blank 16 have great flash B on the periphery.

In a trimming step, for example, while the finish forged blank 16 is nipped and held by a pair of dies, the finish forged blank 16 is punched by a cutting die. Thereby the flash B is removed from the finish forged blank 16, and a forged blank with no flash is obtained. The forged blank with no flash has substantially the same shape as the forged crankshaft 11 shown in FIG. 2F.

In a coining step, main parts of the forged blank with no flash are slightly pressed by dies from above and below so that the forged blank with no flash can have the exact size and shape of the final product. The main parts of the forged blank with no flash are, for example, shaft parts such as the journals J, the pins P, the front part Fr, the flange Fl and the like, and further, the arms A and the weights W. In this way, the forged crankshaft 11 is produced.

The production method shown in FIGS. 2A to 2F is applicable not only to production of a four-cylinder eight-counterweight crankshaft as shown in FIGS. 1A and 1B but also to production of any other crankshaft. For example, the production method is applicable to a four-cylinder four-counterweight crankshaft.

In a four-cylinder four-counterweight crankshaft, only some of the eight arms A1 to A8 incorporate a weight W. For example, the front first arm A1, the rearmost eighth arm A8 and the central two arms (the fourth arm A4 and the fifth arm A5) incorporate a weight W. The other arms, namely the second, the third, the sixth and the seventh arms (A2, A3, A6 and A7) do not have a weight, and these arms are like oval-shaped.

Other crankshafts, for example, crankshafts to be mounted in three-cylinder engines, in-line six-cylinder engines, V-type six-cylinder engines, eight-cylinder engines and others can be produced by the same production method. It is noted that, when adjustment of the placement angles of the pins is necessary, a twisting step is added after the trimming step.

The main purpose of the preforming step is distributing the volume of the billet, and therefore, the blank obtained thereby is hardly in the form of the forged crankshaft. By distributing the volume of the billet in the preforming step, it is possible to decrease the outflow of material and accordingly to decrease the formation of flash in the next die forging step, thereby improving the material yield rate. The material yield rate means the rate (percentage) of the volume of the forged crankshaft (final product) to the volume of the billet.

For example, Japanese Patent Application Publication No. 2001-105087 (Patent Literature 1), Japanese Patent Application Publication No. H2-255240 (Patent Literature 2) and Japanese Patent Application Publication No. H10-029032 (Patent Literature 3) disclose techniques relating to production of a forged crankshaft. Patent Literature 1 teaches a preforming step using a pair of an upper die and a lower die. During pressing of a rod-like workpiece by use of an upper die and a lower die in the preforming step, while a part of the workpiece is elongated, another part connecting thereto is offset from the axis. In the preforming step disclosed in Patent Literature 1, rolling and bending are performed at the same time, which allows a decrease in investment for facilities.

According to Patent Literature 2, in a preforming step, a four-pass high-speed rolling, rather than a conventional two-pass rolling, is performed. A rolled blank obtained by the preforming step have sectional areas that are congruent with the sectional area distribution among weights, arms and journals of the forged crankshaft (final product). According to Patent Literature 2, this improves the material yield rate.

Patent Literature 3 suggests that pressing direction (pressing direction) in a die-forging step should be perpendicular to a bulging direction of weights. Thereby, in the die-forging step, the degree of filling of material in the weights greatly bulging from the arm center plane can be improved. In the method disclosed in Patent Literature 3, the parting faces of the upper die and the lower die are located at the vertexes of the bulging weights, and accordingly, excess material flows out through the space between the upper die and the lower die and forms into flash.

CITATION LIST

Patent Literature

Patent Literature 1: Japanese Patent Application Publication No. 2001-105087
Patent Literature 2: Japanese Patent Application Publication No. H2-255240
Patent Literature 3: Japanese Patent Application Publication No. H10-029032
Patent Literature 4: WO2014/038183

SUMMARY OF INVENTION

Technical Problems

Regarding production of a forged crankshaft, as mentioned above, it is demanded to decrease the outflow of material and accordingly to decrease the formation of flash, thereby improving the material yield rate. In the preforming step disclosed in Patent Literature 1, volume distribution of the billet and offset can be performed to some extent.

Patent Literature 1, however, does not discuss the volume distribution performed in the preforming step in each portion to be formed into an arm incorporating a weight. More specifically, Patent Literature 1 does not discuss distributing the volume of each portion to be formed into an arm incorporating a weight between the weight and the arm. Therefore, the filling of material in the weight, which greatly bulges from the arm center plane, is likely to be insufficient, and deficiency of material is likely to occur in the weight. In order to avoid the deficiency in the weight, a blank with an increased volume shall be used. However, this inevitably decreases the material yield rate. The "portion to be formed into an arm incorporating a weight" includes a portion to be formed into a weight integrated with the arm. In the following paragraphs, a portion to be formed into an arm and a portion to be formed into a weight integrated with the arm are referred to collectively as a "web equivalent portion".

The preforming step taught in Patent Literature 2 is to apply rolling, and therefore, volume distribution in each web equivalent portion between the weight and the arm cannot be performed in the preforming step. Accordingly, in the subsequent die forging step, the filling of material in the weight becomes insufficient, thereby causing problems that deficiency is likely to occur and that the material yield rate becomes lower.

In the method disclosed in Patent Literature 3, the degree of filling of material in a weight in the die forging step can be improved to some extent. In the method disclosed in Patent Literature 3, however, the material yield rate becomes lower as flash is formed. Moreover, in conventional methods for forming a forged crankshaft, the material yield rate is not satisfactorily high. Therefore, a further improvement of material yield rate is demanded.

An object of the present invention is to provide a forged crankshaft production method that achieves an improved material yield rate by distributing the volume of a blank and specifically distributing the volume of each portion to be formed into an arm incorporating a weight between a portion to be formed into the weight and a portion to be formed into the arm.

Solutions to Problems

A forged crankshaft production method according to an embodiment of the present invention is a method for producing a forged crankshaft including journals serving as a center of rotation, pins decentered from the journals, crank arms connecting the journals and the pins, and counterweights integrated with some or all of the crank arms.

The forged crankshaft production method includes a first preforming step, a second preforming step, and a final preforming step. In the first preforming step, the sectional areas of portions of a billet to be formed into the pins and the sectional areas of portions of the billet to be formed into the journals are decreased, whereby flat portions are formed. In the second preforming step, an initial blank obtained by the first preforming step is pressed by a first pair of dies with a width direction of the flat portions set as a pressing direction, whereby an intermediate blank is obtained. In the intermediate blank, portions to be formed into the crank arms incorporating the counterweights are thicker than a finished size, and portions to be formed into the counterweights integrated with the crank arms are thicker than a finished size. In the final preforming step, the portions of the intermediate blank to be formed into the crank arms incorporating the counterweights and the portions of the intermediate blank to be formed into the counterweights integrated with the crank arms are pressed from an axial direction of the intermediate blank, and the intermediate blank is pressed from a direction perpendicular to the axial direction of the intermediate blank, whereby the intermediate blank is formed into a crankshaft shape.

The first pair of dies includes web processing portions to come into contact with the portions to be formed into the crank arms incorporating the counterweights and the portions to be formed into the counterweights integrated with the crank arms, pin processing portions to come into contact with the portions to be formed into the pins, and journal processing portions to come into contact with the portions to be formed into the journals. Each of the web processing portions provided in one of the first pair of dies includes an arm processing part to come into contact with a portion to be formed into a crank arm and a weight processing part to come into contact with a portion to be formed into a counterweight. The arm processing part and the weight processing part form a recessed portion, where the arm processing part is located in a bottom side of the recessed portion and the weight processing portion is located in an open side of the recessed portion, and the width of the open side of the weight processing part becomes greater with increasing distance from the bottom of the recessed portion.

In the second preforming step, the pin processing portions and the journal processing portions press the flat portions, and while the flat portions are pressed, the portions to be formed into the crank arms incorporating the counterweights and the portions to be formed into the counterweights integrated with the crank arms are pushed into the bottom sides of the web processing portions and are deformed.

When the portions to be formed into the crank arms incorporating the counterweights and the portions to be formed into the counterweights integrated with the crank arms are pushed into the bottom sides of the web processing portions and are deformed, the portions to be formed into the crank arms incorporating the counterweights and the portions to be formed into the counterweights integrated with the crank arms are preferably pressed from the open sides of the web processing portions, whereby volume is distributed.

The forged crankshaft may further include a front part located at a front end in the axial direction. In this case, it is preferred that in the first preforming step, further, a sectional area of a portion of the billet to be formed into the front part is decreased, whereby the portion to be formed into the front part is formed into a flat portion. It is preferred that the first pair of dies further includes a front processing portion to come into contact with the portion to be formed into the front part, and in the second preforming step, the portion to be formed into the front part is pressed and elongated by the front processing portion.

The forged crankshaft may further include a flange located at a rear end in the axial direction. In this case, it is preferred that the first pair of dies further includes a flange processing portion to come into contact with the portion to be formed into the flange, and in the second preforming step, while the flat portions are pressed, an end surface of the portion to be formed into the flange is preferably brought into contact with the flange processing portion, whereby a sectional area of the portion to be formed into the flange is increased.

Advantageous Effects of Invention

In a forged crankshaft production method according to the present invention, it is possible to obtain an intermediate blank, in which volume distribution in the axial direction is facilitated with no flash formed, through a first preforming step and a second preforming step. In each web equivalent portion (a portion to be formed into an arm and a portion to be formed into a weight integral with the arm) of the intermediate blank, the volume is distributed appropriately between the portion to be formed into an arm and the portion to be formed into a weight integral with the arm. Accordingly, in a final preforming step, it is possible to form a crankshaft shape with forming almost no flash. This leads to an improvement of the material yield rate.

BRIEF DESCRIPTION OF DRAWINGS

FIG. 22A is a cross-sectional view of the portion to be formed into the flange before undergoing pressing in the exemplary process flow of the second preforming step.

FIG. 22B is a cross-sectional view of the portion to be formed into the flange at the completion of pressing in the exemplary process flow of the second preforming step.

DESCRIPTION OF EMBODIMENTS

A forged crankshaft production method according to an embodiment of the present invention will hereinafter be described with reference to the drawings.

1. Exemplary Production Process

Figure 1A:
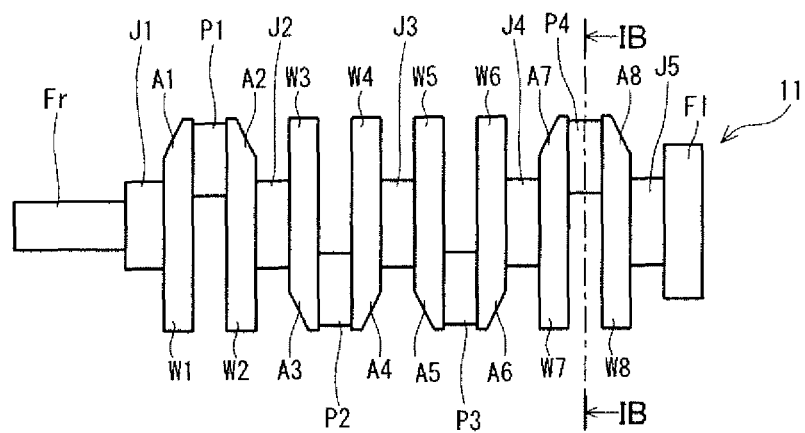
FIG. 1A is a schematic diagram of a common forged crankshaft showing an example of the overall shape thereof.
Figure 1B:
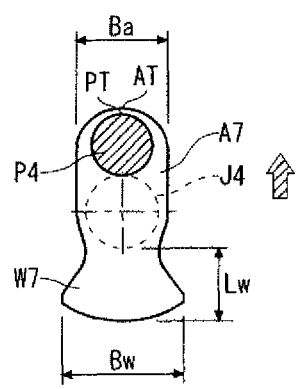
FIG. 1B is a sectional view along the line IB-IB in FIG. 1A.
Figure 2A:
FIG. 2A is a schematic diagram of a billet during a conventional process of producing a common forged crankshaft.
Figure 2B:
FIG. 2B is a schematic diagram of a rolled blank during the conventional process of producing a common forged crankshaft.
Figure 2C:
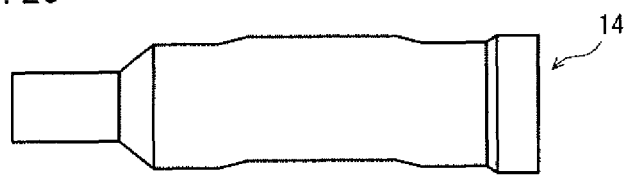
FIG. 2C is a schematic diagram of a bent blank during the conventional process of producing a common forged crankshaft.
Figure 2D:
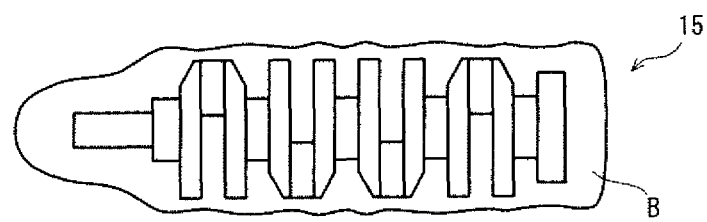
FIG. 2D is a schematic diagram of a rough forged blank during the conventional process of producing a common forged crankshaft.
Figure 2E:
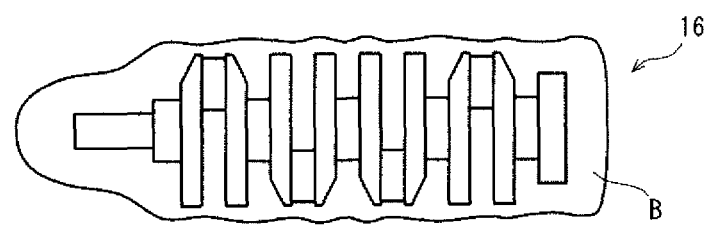
FIG. 2E is a schematic diagram of a finish forged blank during the conventional process of producing a common forged crankshaft.
Figure 2F:
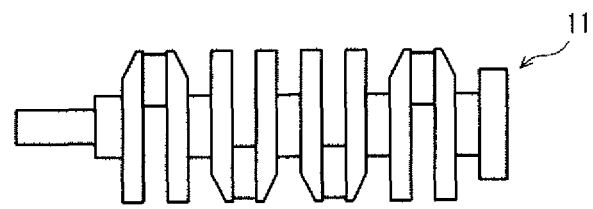
FIG. 2F is a schematic diagram of a crankshaft during the conventional process of producing a common forged crankshaft.

The method according to the present embodiment is intended to produce a forged crankshaft including journals J serving as a center of rotation, pins P decentered from the journals J, arms A connecting the journals J and the pins P, and weights W integrated with some or all of the arms A. For example, the method according to the embodiment is intended to produce a four-cylinder eight-counterweight crankshaft as shown in FIGS. 1A and 1B. The method is applicable to production of a four-cylinder four-counterweight crankshaft as described above.

The forged crankshaft production method according to the present embodiment includes a first preforming step, a second preforming step, and a final preforming step to be executed in this order. After the final preforming step, a finish forging step and a trimming step may be additionally executed. If necessary, a coining step may be executed after the trimming step. When adjustment of the placement angles of the pins is necessary, a twisting step may be executed after the trimming step. These steps are hot working and executed sequentially.

Figure 3A:
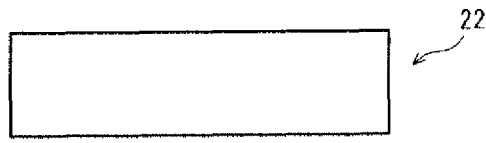
FIG. 3A is a schematic diagram of a billet during an exemplary forged crankshaft production process according to the present invention.
Figure 3B:
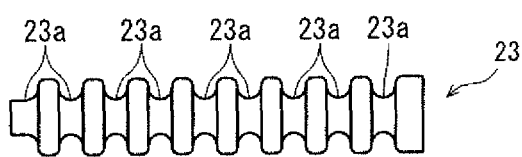
FIG. 3B is a schematic diagram of an initial blank during the exemplary forged crankshaft production process according to the present invention.
Figure 3C:
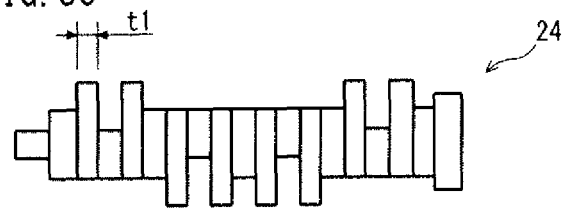
FIG. 3C is a schematic diagram of an intermediate blank during the exemplary forged crankshaft production process according to the present invention.
Figure 3D:
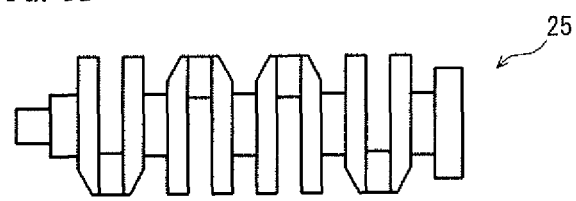
FIG. 3D is a schematic diagram of a final blank during the exemplary forged crankshaft production process according to the present invention.
Figure 3E:
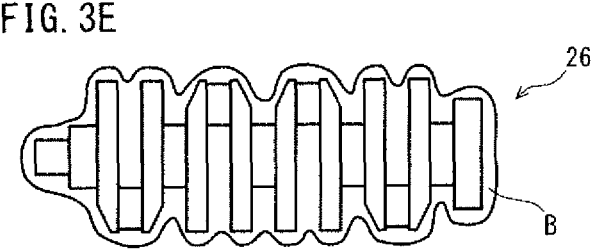
FIG. 3E is a schematic diagram of a finish forged blank during the exemplary forged crankshaft production process according to the present invention.
Figure 3F:
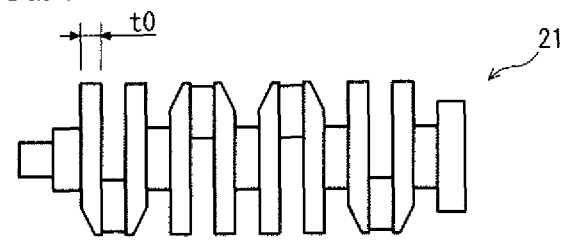
FIG. 3F is a schematic diagram of a forged crankshaft during the exemplary forged crankshaft production process according to the present invention.

FIGS. 3A to 3F are diagrams showing an exemplary forged crankshaft production process according to the present invention. FIG. 3A shows a billet, FIG. 3B shows an initial blank, FIG. 3C shows an intermediate blank, FIG. 3D shows a final blank, FIG. 3E shows a forged blank, and FIG. 3F shows a forged crankshaft. FIGS. 3A to 3F show an exemplary production process of a crankshaft having the shape shown in FIG. 1.

In the first preforming step, the sectional areas of the portions of a workpiece, that is, a billet 22, to be formed into pins (the portions hereinafter being referred to as "pin equivalent portions") and to be formed into journals (the portions hereinafter being referred to as "journal equivalent portions") are decreased. Thereby, flat portions 23a are formed in the billet, and each of the flat portions 23a has a width (dimension in a direction perpendicular to a pressing direction) Ba greater than a thickness (dimension in the pressing direction) ta as shown in FIGS. 5B and 6B, which will be described later. Thus, an initial blank 23, in which the volume has been distributed, is obtained. In the first preforming step, for example, reduce rolls or cross rolls may be used. Alternatively, the first preforming step may be executed following a process flow using a third pair of dies as will be described later.

In the second preforming step, for further volume distribution, the initial blank 23 is pressed by a first pair of dies. The pressing direction in this step is the width direction of the flat portions 23a. Thereby, an intermediate blank 24 without flash is obtained. In the intermediate blank 24, the web equivalent portions (portions to be formed into arms and portions to be formed into weights integrated with the arms) have a thickness (dimension in the axial direction) t1 greater than the finished size t0. The finished size t0 means the thickness (dimension in the axial direction) of the arms and weights of a forged crankshaft (final product). The details of the second preforming step will be described later.

In the final preforming step, the web equivalent portions of the intermediate blank 24 are pressed along the axial direction of the intermediate blank 24 and in a direction perpendicular to the axial direction of the intermediate blank 24. In this way, the intermediate blank 24 is roughly formed into a forged crankshaft shape, and thereby, a final blank 25 is obtained. In the final preforming step, for example, a forming apparatus disclosed in Patent Literature 4 may be used. An exemplary process flow of the final preforming step will be described later.

In the finish forging step, die forging is carried out in the same manner as in the above-described conventional finish forging step. Specifically, the final blank 25 is forged by a pair of an upper die and a lower die. During this step, excess material flows out and forms into flash B, and then, a finish forged blank 26 is obtained. The finish forged blank 26 has a shape in agreement with the shape of a crankshaft that is a final product. Since the final blank 25, which is an in-process material, is roughly formed into a crankshaft shape, it is possible to decrease the outflow of excess material, thereby minimizing the flash B formed in the finish forging step.

In the trimming step, for example, while the finish forged blank 26 with flash is held in a pair of dies, the flash B is cut out by a cutting die. Thus, the flash B is removed from the finish forged blank 26. Then, a forged crankshaft 21 (final product) is obtained.

Patent Literature 4 suggests a forming apparatus that forms a rough blank that is roughly in the form of a crankshaft shape into a blank for finish forging. The rough blank is obtained by applying reduction rolling and bending to a round billet repeatedly. Then, after the blank for finish forging is formed, finish forging and trimming are applied sequentially to the blank for finish forging.

The production method according to the present embodiment differs from the production process disclosed in Patent Literature 4 in the step of obtaining a rough blank from a billet. Specifically, the production method according to the present embodiment does not include the step of applying reduction rolling and bending repeatedly to the billet and instead includes the first preforming step and the second preforming step. The final preforming step in the production method according to the present embodiment corresponds to the processing performed by the forming apparatus disclosed in Patent Literature 4, that is, corresponds to the formation of a blank for finish forging from a rough blank. In the method according to the present embodiment, moreover, finish forging and trimming are sequentially applied to the final blank (corresponding to the blank for finish forging in Patent Literature 4).

2. Exemplary Process Flow of First Preforming Step

Figure 4A:
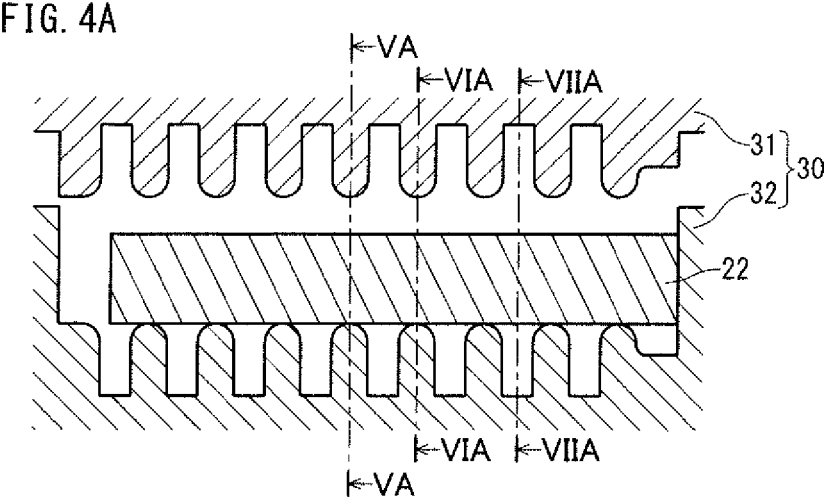
FIG. 4A is a longitudinal sectional view showing a state before pressing in an exemplary process flow of a first preforming step.
Figure 4B:
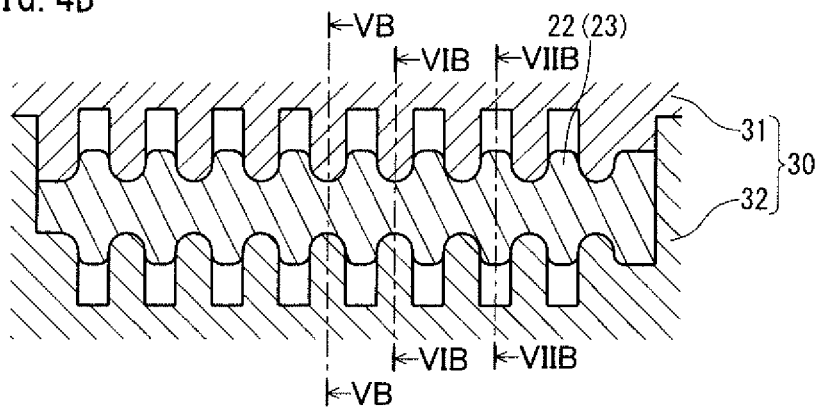
FIG. 4B is a longitudinal sectional view showing a state at the completion of pressing in the exemplary process flow of the first preforming step.

FIGS. 4A to 7B are diagrams showing an exemplary process flow of the first preforming step. FIG. 4A is a longitudinal sectional view showing a state before pressing, and FIG. 4B is a longitudinal sectional view showing a state at the completion of pressing.

Figure 5A:
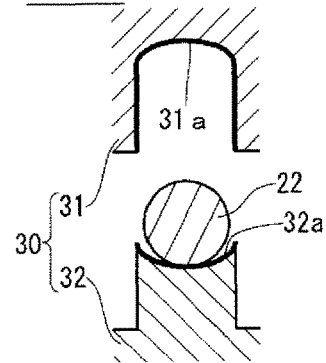
FIG. 5A is a cross-sectional view of a portion to be formed into a journal before undergoing pressing in the exemplary process flow of the first preforming step.
Figure 5B:
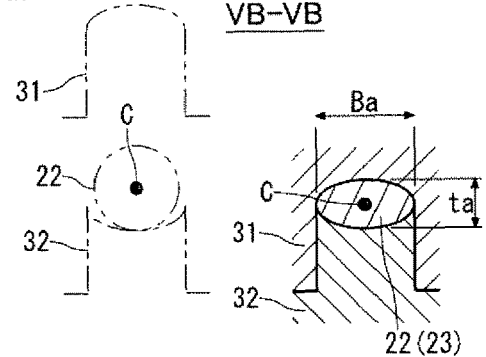
FIG. 5B is a cross-sectional view of the portion to be formed into a journal at the completion of pressing in the exemplary process flow of the first preforming step.

FIGS. 5A and 5B are cross-sectional views of a portion to be formed into a journal (journal equivalent portion). FIG. 5A shows a state before pressing, and FIG. 5B shows a state at the completion of pressing. FIG. 5A is a sectional view along the line VA-VA in FIG. 4A, and FIG. 5B is a sectional view along the line VB-VB in FIG. 4B.

Figure 6A:
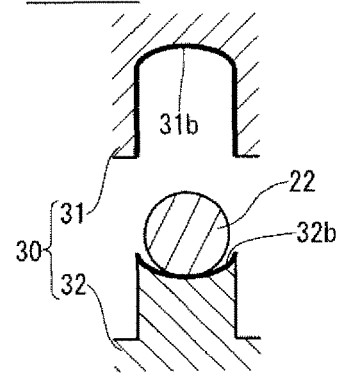
FIG. 6A is a cross-sectional view of a portion to be formed into a pin before undergoing pressing in the exemplary process flow of the first preforming step.
Figure 6B:
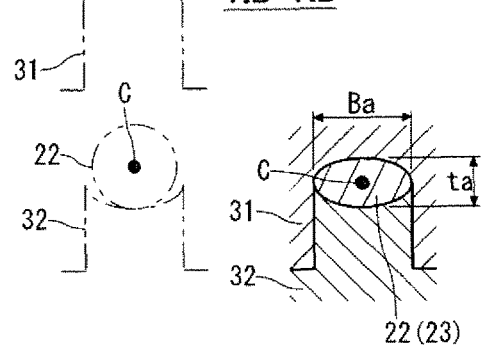
FIG. 6B is a cross-sectional view of the portion to be formed into a pin at the completion of pressing in the exemplary process flow of the first preforming step.

FIGS. 6A and 6B are cross-sectional views of a portion to be formed into a pin (pin equivalent portion). FIG. 6A shows a state before pressing, and FIG. 6B shows a state at the completion of pressing. FIG. 6A is a sectional view along the line VIA-VIA in FIG. 4A, and FIG. 6B is a sectional view along the line VIB-VIB in FIG. 4B.

Figure 7A:
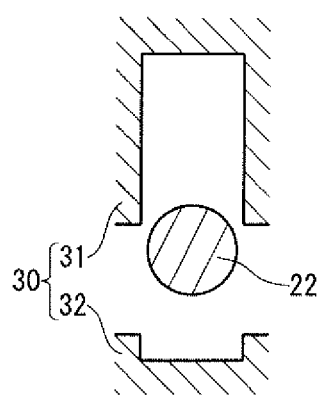
FIG. 7A is a cross-sectional view of a portion to be formed into an arm incorporating a weight before undergoing pressing in the exemplary process flow of the first preforming step.
Figure 7B:
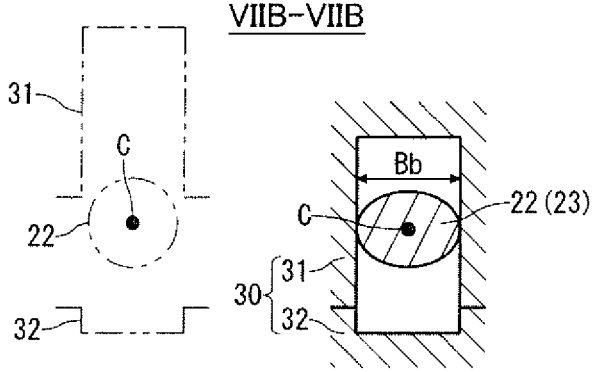
FIG. 7B is a cross-sectional view of the portion to be formed into an arm incorporating a weight at the completion of pressing in the exemplary process flow of the first preforming step.

FIGS. 7A and 7B are cross-sectional views of a portion to be formed into an arm incorporating a weight (web equivalent portion). FIG. 7A shows a state before pressing, and FIG. 7B shows a state at the completion of pressing. FIG. 7A is a sectional view along the line VIIA-VIIA in FIG. 4A, and FIG. 7B is a sectional view along the line VIIB-VIIB in FIG. 4B.

In FIGS. 4A to 7B, a billet 22 that is circular in cross section, and a third pair of dies 30 are shown. The third pair of dies 30 includes a third upper die 31 and a third lower die 32. For easy understanding of the drawings, in FIGS. 5B, 6B and 7B, the third upper die 31, the third lower die 32 and the billet 22 in a state before pressing are indicated by two-dot chain lines, and the axis position C of the journal equivalent portion is indicated by a black circle. The third pair of dies 30 includes pin processing portions to come into contact with pin equivalent portions, and journal processing portions to come into contact with journal equivalent portions.

In this exemplary process flow, as indicated by the heavy lines in FIG. 5A, each of the journal processing portions includes a first journal processing part 31a provided in one of the third pair of dies, and a second journal processing part 32a provided in the other of the third pair of dies. The first journal processing part 31a is recessed and is capable of housing a billet. In this process flow, the journal processing part provided in the upper die 31 is recessed and is capable of housing a billet, that is, the first journal processing part 31a. The journal processing part provided in the lower die 32 is the second journal processing part 32a, and the second journal part 32a is located on the edge surface of a raised portion. There is no limit as to which of the upper die and the lower die includes such recessed journal processing parts that are capable of housing a billet (first journal processing parts). Accordingly, the lower die may include recessed journal processing parts that are capable of housing a billet (first journal processing parts).

In this exemplary process flow, as indicated in the heavy lines in FIG. 6A, each of the pin processing portions includes a first pin processing part 31b provided in one of the third pair of dies, and a second pin processing part 32b provided in the other of the third pair of dies. The first pin processing part 31b is recessed and is capable of housing a billet. In this process flow, the pin processing part provided in the upper die 31 is recessed and is capable of housing a billet, that is, the first pin processing part 31b. The pin processing part provided in the lower die 32 is the second pin processing part 32b, and the second pin processing part 32b is located on the edge surface of a raised portion. There is no limit as to which of the upper die and the lower die includes such recessed pin processing parts that are capable of housing a billet (first pin processing parts). Accordingly, the lower die may include recessed pin processing parts that are capable of housing a billet (first pin processing parts).

In the exemplary process flow of the first preforming step, as shown in FIG. 4A, the upper die 31 is moved up and is separated from the lower die 32, and the billet 22 is placed between the upper die 31 and the lower die 32. Then, when the upper die 31 is moved down, the pin equivalent portions of the billet 22 are housed in the respective recessed first pin processing parts 31b, and the journal equivalent portions of the billet 22 are housed in the respective recessed first journal processing parts 31a. When the upper die 31 is moved further down, the billet is pressed by the pin processing parts 31b and 32b and by the journal processing parts 31a and 32a, and the sectional areas of the pin equivalent portions and the journal equivalent portions are decreased. Then, flat portions as shown in FIGS. 5B and 6B are formed. Each of the flat portions has a width Ba greater than a thickness ta (see FIGS. 5B and 6B). After the completion of pressing by the third pair of dies 30, the upper die 31 is moved up, and a processed billet 22 (initial blank 23) is taken out.

In such a process flow, while the pin equivalent portions and the journal equivalent portions are pressed, the material flows in the axial direction of the billet and flows into the web equivalent portions between the pin equivalent portions and the journal equivalent portions. This results in obtainment of an initial blank with its volume distributed in the axial direction.

In the process flow shown in FIGS. 4A to 7B, as the upper die is being moved down, the holes of the recessed first pin processing parts 31b are closed by the second pin processing parts 32b, and the first and the second pin processing parts form closed cross-sections. Also, the holes of the recessed first journal processing parts 31a are closed by the second journal processing parts 32a, and the first and the second journal processing parts form closed cross-sections. This prevents the material from flowing in between the upper die 31 and the lower die 32 and accordingly prevents formation of flash. This improves the material yield rate and facilitates volume distribution in the axial direction.

When the third pair of dies is used in the first preforming step, with a view to facilitating the volume distribution in the axial direction, the web equivalent portions shall not be pressed by the third pair of dies. With a view to adjusting the shapes (dimensions) of the web equivalent portions, the web equivalent portions may be partly pressed by the third pair of dies (see FIGS. 7A and 7B). For example, in order to make the web equivalent portions have a width Bb equal to the width Ba of the flat portions, the web equivalent portions may be partly pressed by the third pair of dies.

3. Exemplary Process Flow of Second Preforming Step

Figure 8A:
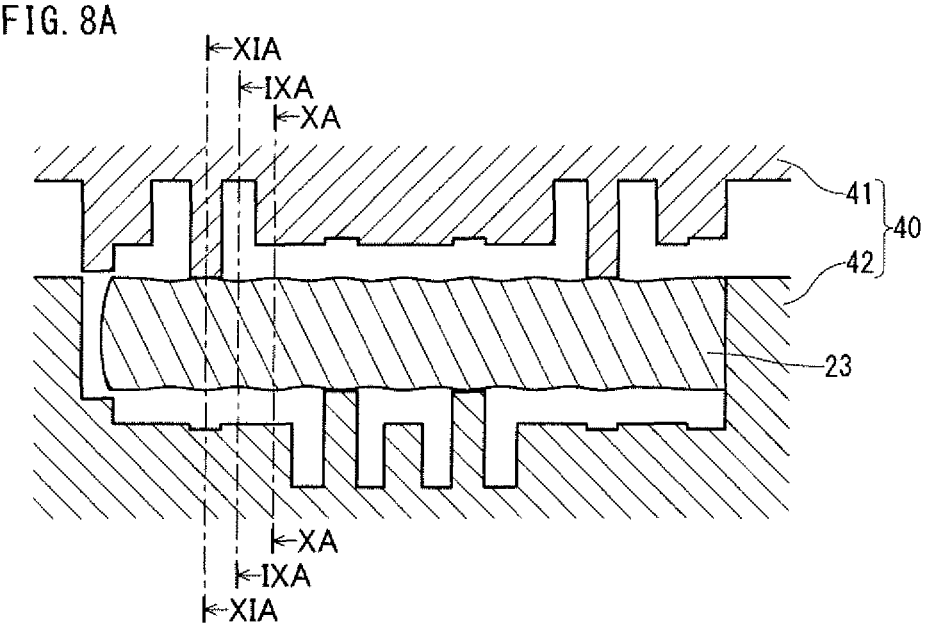
FIG. 8A is a longitudinal sectional view showing a state at the start of pressing in an exemplary process flow of a second preforming step.
Figure 8B:
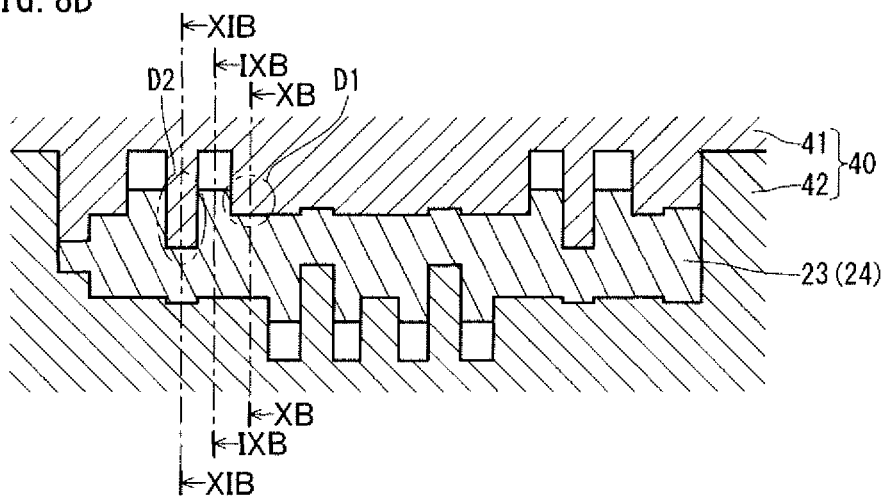
FIG. 8B is a longitudinal sectional view showing a state at the completion of pressing in the exemplary process flow of the second preforming step.

FIGS. 8A to 11B are diagrams showing an exemplary process flow of the second preforming step. FIG. 8A is a longitudinal sectional view showing a state at the start of pressing, and FIG. 8B is a longitudinal sectional view showing a state at the completion of pressing.

Figure 9A:
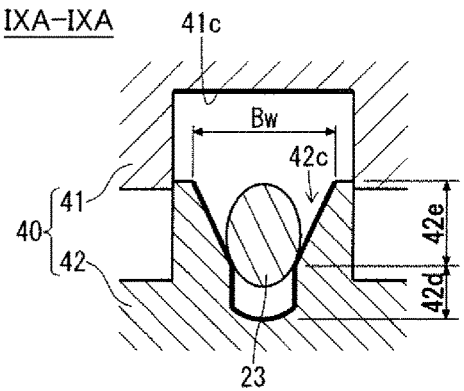
FIG. 9A is a cross-sectional view of a portion to be formed into an arm incorporating a weight at the start of pressing in the exemplary process flow of the second preforming step.
Figure 9B:
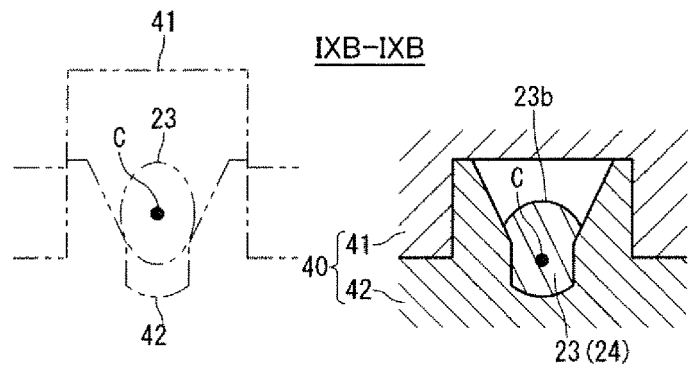
FIG. 9B is a cross-sectional view of the portion to be formed into an arm incorporating a weight at the completion of pressing in the exemplary process flow of the second preforming step.

FIGS. 9A and 9B are sectional views of a portion to be formed into an arm incorporating a weight (web equivalent portion). FIG. 9A shows a state at the start of pressing, and FIG. 9B shows a state at the completion of pressing. FIG. 9A is a sectional view along the line IXA-IXA in FIG. 8A, and FIG. 9B is a sectional view along the line IXB-IXB in FIG. 8B.

Figure 10A:
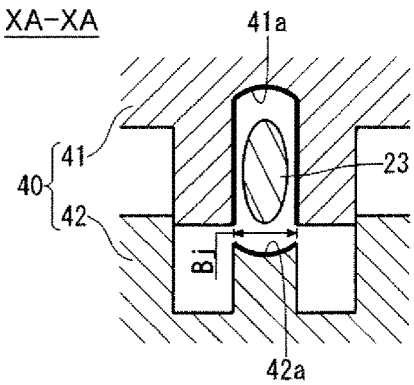
FIG. 10A is a cross-sectional view of a portion to be formed into a journal at the start of pressing in the exemplary process flow of the second preforming step.
Figure 10B:
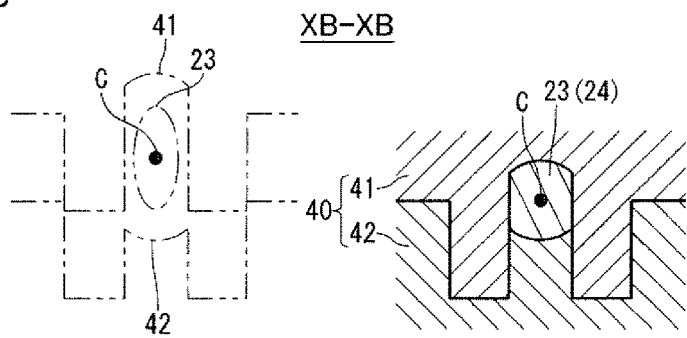
FIG. 10B is a cross-sectional view of the portion to be formed into a journal at the completion of pressing in the exemplary process flow of the second preforming step.

FIGS. 10A and 10B are cross-sectional views of a portion to be formed into a journal (journal equivalent portion). FIG. 10A shows a state at the start of pressing, and FIG. 10B shows a state at the completion of pressing. FIG. 10A is a sectional view along the line XA-XA in FIG. 8A, and FIG. 10B is a sectional view along the line XB-XB in FIG. 8B.

Figure 11A:
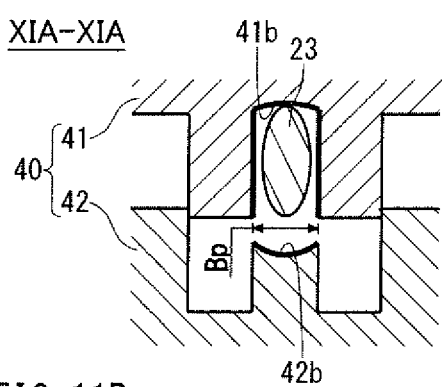
FIG. 11A is a cross-sectional view of a portion to be formed into a pin at the start of pressing in the exemplary process flow of the second preforming step.
Figure 11B:
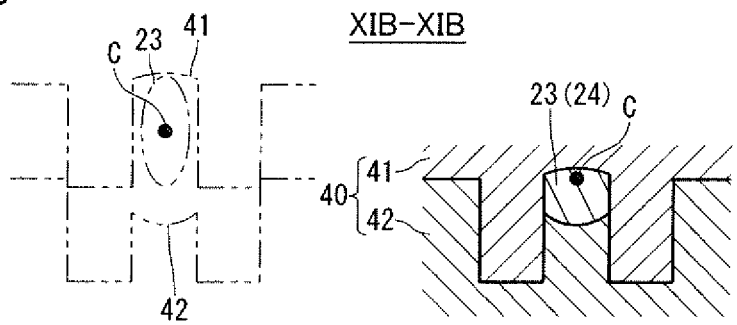
FIG. 11B is a cross-sectional view of the portion to be formed into a pin at the completion of pressing in the exemplary process flow of the second preforming step.

FIGS. 11A and 11B are cross-sectional views of a portion to be formed into a pin (pin equivalent portion). FIG. 11A shows a state at the start of pressing, and FIG. 11B shows a state at the completion of pressing. FIG. 11A is a sectional view along the line XIA-XIA in FIG. 8A, and FIG. 11B is a sectional view along the line XIB-XIB in FIG. 8B.

In FIGS. 8A to 11B, the initial blank 23 obtained by the first preforming step, and a first pair of dies 40 are shown. The first pair of dies 40 includes a first upper die 41 and a first lower die 42. For easy understanding of the drawings, in FIGS. 9B, 10B and 11B, the first upper die 41, the first lower die 42 and the initial blank 23 at the start of pressing are indicated by two-dot chain lines, and the axis position C of the journal equivalent portion is indicated by a black circle. The first pair of dies 40 includes web processing portions including parts 41c and 42c to come into contact with the web equivalent portions, pin processing portions including parts 41b and 42b to come into contact with the pin equivalent portions, and journal processing portions including parts 41a and 42a to come into contact with the journal equivalent portions.

In each of the web processing portions, as indicated by the heavy lines in FIG. 9A, one of the upper die 41 and the lower die 42 has a generally concave cross-sectional shape. In this exemplary process flow, in each of the web processing portions, the lower web processing part 42c is wholly recessed, and the other (upper) web processing part 41c is flat. Which of the upper die and the lower die includes recessed web processing parts can be determined according to the shape of the forged crankshaft to be produced.

The recessed web processing part 42c (provided in the lower die in the case of FIG. 9A) includes an arm processing part 42d to come into contact with a portion to be formed into an arm (which will hereinafter be referred to as an "arm equivalent portion"), and a weight processing part 42e to come into contact with a portion to be formed into a weight (which will hereinafter be referred to as a "weight equivalent portion"). The arm processing part 42d occupies the bottom side of the recessed web processing part 42c, and the weight processing part 42e occupies the open side of the recessed web processing part 42c. The width Bw of the open side of the weight processing part 42e becomes greater with increasing distance from the bottom of the recessed web processing part. In this process flow, as shown in FIG. 9A, both sides of the weight processing part 42e are inclined surfaces. Both sides of the arm processing part 42d are parallel surfaces, and accordingly, the width Bw of the open side of the arm processing part 42d is constant.

In the second preforming step, as mentioned above, each of the web equivalent portions is formed into a shape having a greater thickness than the finished size. Accordingly, the web processing parts 41c and 42c are designed to have a dimension in the axial direction greater than that of a finished web (arm incorporating a weight).

In this exemplary process flow, as indicated by the heavy lines in FIG. 10A, each of the journal processing portions includes a first journal processing part 41a provided in one of the first dies 41 and 42, and a second journal processing part 42a provided in the other of the first dies. The first journal processing part 41a is recessed and is capable of entirely housing a flat portion of the initial blank 23. More specifically, the journal processing part provided in the upper die 41 is a recessed part that is capable of entirely housing a flat portion of the initial blank 23, that is, the first journal processing part 41a. The journal processing part provided in the lower die 42 is the second journal processing part 42a, and the second journal processing part 42a is located on the edge surface of a raised portion. There is no limit as to which of the upper die and the lower die includes such recessed journal processing parts each of which is capable of entirely housing a flat portion of the initial blank (first journal processing parts). Accordingly, the lower die may include recessed journal processing parts each of which is capable of entirely housing a flat portion of the initial blank (first journal processing parts).

In this exemplary process flow, as indicated by the heavy lines in FIG. 11A, each of the pin processing portions includes a first pin processing part 41b provided in one of the first dies 41 and 42, and a second pin processing part 42b provided in the other of the first dies. The first pin processing part 41b is recessed and is capable of entirely housing a flat portion of the initial blank 23. More specifically, the pin processing part provided in the upper die 41 is a recessed part that is capable of entirely housing a flat portion of the initial blank 23, that is, the first pin processing part 41b. The pin processing part provided in the lower die 42 is the second pin processing part 42b, and the second pin processing part 42b is located on the edge surface of a raised portion. There is no limit as to which of the upper die and the lower die includes such recessed pin processing parts each of which is capable of entirely housing a flat portion of the initial blank (first pin processing parts). Accordingly, the lower die may include recessed pin processing parts each of which is capable of entirely housing a flat portion of the initial blank (first pin processing parts).

In the process flow of the second preforming step using the first pair of dies 40, the upper die 41 is moved up and separated from the lower die 42, and the initial blank 23 is placed between the upper die 41 and the lower die 42. In this regard, in order to set the width direction of the flat portions (major radial direction when the flat portions are ellipses) of the initial blank 23 as the pressing direction, the initial blank 23 is rotated 90 degrees around the axis from the state at the completion of the first preforming step (the billet), and then placed between the dies 41 and 42.

Then, the upper die 41 is moved down, and as shown in FIGS. 10A and 11A, the flat portions of the initial blank 23 are housed in the recessed first journal processing parts 41a and the recessed first pin processing parts 41b. At this time, as shown FIG. 9A, each of the web equivalent portions is mostly placed in the weight processing part 42e without contacting the bottom of the web processing part.

When the upper die 41 is moved further down, the first pin processing parts 41b and the second pin processing parts 42b form closed cross-sections. Also, the first journal processing parts 41a and the second journal processing parts 42a form closed cross-sections. Then, when the upper die 41 is moved further down to the bottom dead point, the flat portions in the spaces enclosed by the first pin processing parts 41b and the second pin processing parts 42b are entirely pressed. Also, the flat portions in the spaces enclosed by the first journal processing parts 41b and the second journal processing parts 42b are entirely pressed. In this way, the flat portions of the initial blank 23 are pressed by the first pair of dies, and the sectional areas of the journal equivalent portions and the pin equivalent portions are decreased. At the same time, excess material flows in the axial direction into the arm equivalent portions, and thus, volume distribution is progressed. Also, the center of mass of each of the pin equivalent portions moves in the decentering direction of the pin (see the hatched arrow in FIG. 1B).

Each of the web equivalent portions is not pressed by the other web processing part (web processing part provided in the upper die in the case of FIGS. 9A and 9B). However, each of the web equivalent portions is pushed into the bottom side of the recessed web processing part 42c as the pressing by the first pair of dies 40 is advancing. The pushing arises along with the pressings (deformations) of the journal equivalent portion and the pin equivalent portion located adjacent to the web equivalent portion. At the time of pushing, the web equivalent portion deforms along the arm processing part and the weight processing part. Thereby, the width of the web equivalent portion becomes smaller in the portion located in the bottom side of the recessed processing part (arm equivalent portion) and becomes greater in the portion located in the open side of the recessed processing part (weight equivalent portion). Also, the openside surface 23b of the web equivalent portion becomes arc-shaped in cross section.

Thus, when each of the web equivalent portions deforms, especially when the weight equivalent portion is shaped by the weight processing part, the pin processing parts 41b, 42b and the journal processing parts 41a and 42a are present on the front side and the rear side of the weight equivalent portion along the axial direction. In this case, the upper portion of the first pin processing part 41b (portion enclosed by the circle D2 in FIG. 8B) and the upper portion of the first journal processing part 41a (portion enclosed by the ellipse D1 in FIG. 8B) serve as partitions that control the flow of material in the axial direction. This prevents the material from flowing in the axial direction from each of the weight equivalent portions. As mentioned above, the web processing parts 41c (web processing parts provided in the upper die in the case of FIGS. 9A and 9B) do not press the web equivalent portions, and this facilitates the material to flow into the web equivalent portions from the pin equivalent portions and the journal equivalent portions. Moreover, this prevents outflow of excess material and makes it possible to form weight equivalent portions without forming flash.

After the completion of pressing by the first pair of dies 40, the upper die 41 is moved up, and a processed initial blank 23 (intermediate blank 24) is taken out. The web equivalent portions of the obtained intermediate blank 24 have a thickness greater than the finished size.

In the second preforming step, the material is caused to flow from the pin equivalent portions and the journal equivalent portions to the web equivalent portions, which results in volume distribution in the axial direction. Also, in each of the web equivalent portions, the material flows inside kept back by the arm processing part and the weight processing part, and the web equivalent portion is formed into a shape having a smaller width in the portion in the bottom side of the recessed processing part and a greater width in the portion in the open side of the recessed processing part. Thus, volume distribution inside each of the web equivalent portions can be done, and thereby, the risk of deficiency in the weights possibly caused in the subsequent final preforming and finish forging steps can be pressed. Also, the amount of excess material for the weight equivalent portions can be pressed, and the material yield rate can be increased.

In the exemplary process flow, the flat portions are housed in the recessed first pin processing parts 41b and the recessed first journal processing parts 41a. Thereafter, closed cross-sections are formed by the first pin processing parts 41b and the second pin processing parts 42b, and closed cross-sections are formed by the first journal processing parts 41a and the second journal processing parts 42a. The flat portions are pressed in this state, and therefore, the material never flows to between the upper die 41 and the lower die 42. This improves the material yield rate and facilitates the flow of material from the pin equivalent portions and the journal equivalent portions to the web equivalent portions.

As will be described later, in the second preforming step, the outflow of material and the formation of flash may be prevented by partial pressing by the first pin processing parts 41b and the second pin processing parts 42b. Also, the outflow of material and the formation of flash may be prevented partial pressing by the first journal processing parts 41a and the second journal processing parts 42a.

4. Exemplary Process Flow of Final Preforming Step

Figure 12A:
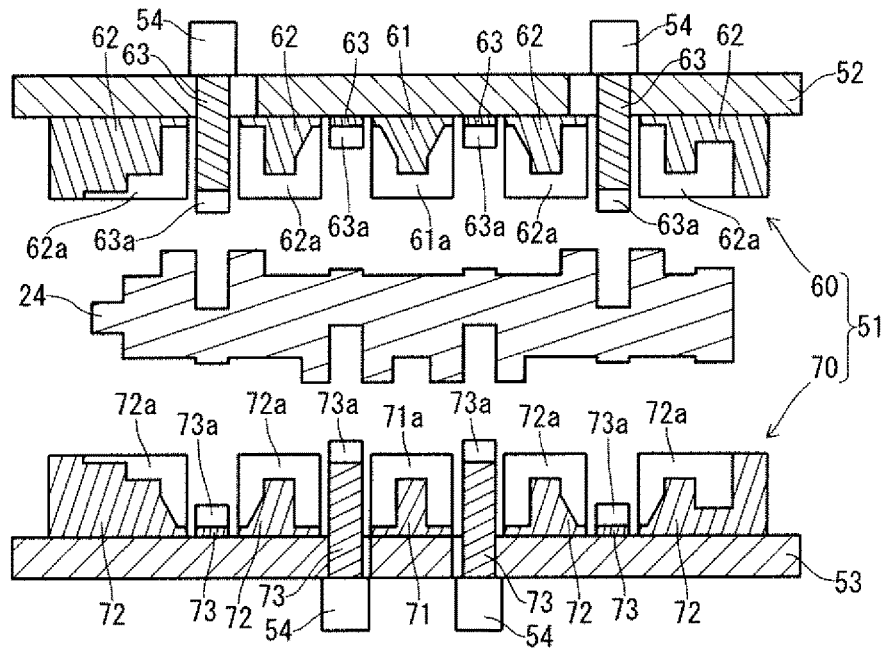
FIG. 12A is a longitudinal sectional view showing a state before pressing in an exemplary process flow of a final preforming step.
Figure 12B:
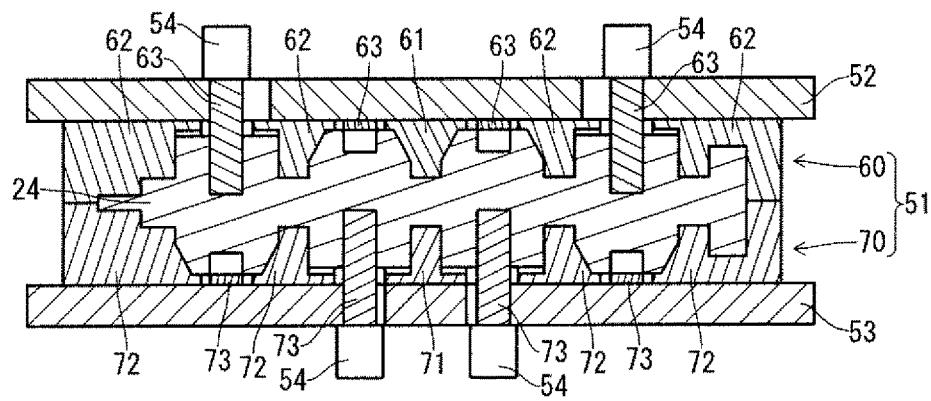
FIG. 12B is a longitudinal sectional view showing a state where an upper die has reached the bottom dead point in the exemplary process flow of the final preforming step.
Figure 12C:
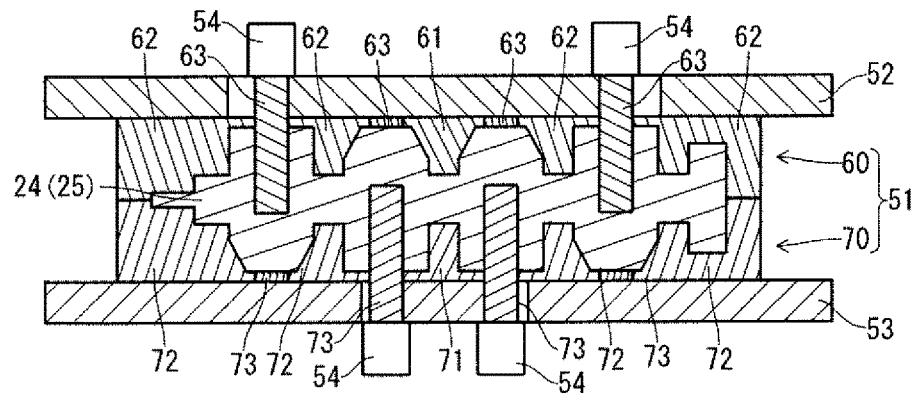
FIG. 12C is a longitudinal view showing a state at the completion of an axial movement in the exemplary process flow of the final preforming step.

FIGS. 12A to 12C are longitudinal sectional views schematically showing an exemplary process flow of the final preforming step. FIG. 12A shows a state before pressing, FIG. 12B shows a state where the upper die has reached the bottom dead point, and FIG. 12C shows a state at the completion of an axial movement. In FIGS. 12A to 12C, the intermediate blank 24 obtained by the second preforming step, a second pair of dies 51, an upper plate 52 and a lower plate 53 are shown. The second pair of dies 51 includes a second upper die 60 and a second lower die 70. The second upper die 60 is held by the upper plate 52, and the upper plate 52 moves up and down along with operation of a pressing machine (not shown). The second lower die 70 is held by the lower plate 53, and the lower plate 53 is fixed to the pressing machine (not shown).

For pressing of the web equivalent portions (portions to be formed into arms and portions to be formed into weights integrated with the arms) from the axial direction of the intermediate blank 24, each of the second upper die 60 and the second lower die 70 is divided into some parts. The parts composing the second upper die 60 are arranged in the axial direction of the intermediate blank 24, and the parts composing the second lower die 70 are arranged in the axial direction of the intermediate blank 24. The second upper die 60 includes a fixed journal die component 61, movable journal die components 62 and pin die components 63. The second lower die 70 includes a fixed journal die component 71, movable journal die components 72 and pin die components 73.

The fixed journal die components 61 and 71 are to press the central journal equivalent portion of the intermediate blank 24 and the web equivalent portions adjacent thereto, and the fixed journal die components 61 and 71 are not movable in the axial direction. The movable journal die components 62 and 72 form some pairs of die components that are to press the journal equivalent portions other than the central journal equivalent portion. The movable journal die components 62 and 72 are also to press the web equivalent portions, a portion to be formed into the front part and a portion to be formed into the flange that are connected to the journal equivalent portions. The movable journal die components 62 and 72 are movable in the axial direction.

The pin die components 63 and 73 are to press the pin equivalent portions of the intermediate blank 24, and are movable in the axial direction. Moreover, either the pin die components 63 of the upper die 60 or the pin die components 73 of the lower die 70 are movable relative to the plate 52 or 53 holding the die components 63 or 73. The direction of the relative movement is along the pin decentering direction. Thereby, the pin equivalent portions of the intermediate blank 24 can be decentered. The relative movement can be made by a hydraulic cylinder 54, for example. It is determined according to the shape of the forged crankshaft to be produced, which are relatively movable, the pin die components 63 of the upper die 60 or the pin die components 73 of the lower die 70.

The third upper die 60 and the third lower die 70 formed by such components have impressions (see reference symbols 61a, 62a, 63a, 71a, 72a and 73a in FIG. 12A). The impressions reflect the approximate shape of the crankshaft (final product).

In the final preforming step, the upper die 60 is moved up, and the intermediate blank 24 is placed between the upper die 60 and the lower die 70 with the pin decentering direction set as the pressing direction. Next, the upper die 60 is moved down, and the intermediate blank 24 is pressed by the upper die 60 and the lower die 70. Thereby, the journal equivalent portions of the intermediate blank 24 are pressed and formed into approximate shapes of the journals.

While the journal equivalent portions of the intermediate blank 24 are kept pressed, the movable journal die components 62 and 72 and the pin die components 63 and 73 are moved in the axial direction toward the central fixed journal die components 61 and 71. The movements can be made by a wedge mechanism or a hydraulic cylinder, for example.

Along with the axial movements of the movable journal die components 62 and 72 and the pin die components 63 and 73, the web equivalent portions are pressed in the axial direction of the intermediate blank 24. Thereby, the web equivalent portions are formed into approximate shapes of the arms and the weights. At this time, the thickness of the web equivalent portions becomes equal to the finished size.

According to the axial movements of the movable journal die components 62 and 72 and the pin die components 63 and 73, the pin die components 63 of the upper die 60 or the pin die components 73 of the lower die 70 are moved in the pin decentering direction. Thereby, the pin equivalent portions are decentered. The pin equivalent portions are also pressed by the pin die components 63 and 73, and the pin equivalent portions are formed into approximate shapes of the pins.

After the completion of pressing by the second pair of dies 51, the upper die 60 is moved up, and a processed intermediate blank 24 (final blank) is taken out.

In the final preforming step, the web equivalent portions are pressed in the axial direction, and this improves the degree of filling of material in the weights, thereby preventing deficiency of material in the weights. Since the filling of material in the weights is good, a final blank with no or almost no flash can be obtained.

In the forged crankshaft production method according to the embodiment, an intermediate blank without flash can be obtained by the first preforming step and the second preforming step. Accordingly, the material yield rate can be improved.

In the forged crankshaft production method according to the embodiment, additionally, volume distribution in the axial direction can be facilitated in the first preforming step and the second preforming step. Thus, the sectional areas of the pin equivalent portions and the journal equivalent portions are decreased, and the sectional areas of the web equivalent portions are increased. In the second preforming step, each of the web equivalent portions is formed to have a smaller width in the arm equivalent portion and a greater width in the weight equivalent portion, and thus, the volume is distributed inside each of the web equivalent portions. This permits formation of an approximate crankshaft shape without flash in the next final preforming step. By using the final blank having an approximate crankshaft shape in the finish forging step, it is possible to minimize outflow of excess material, thereby minimizing formation of flash, in the finish forging step. Also for this reason, the material yield rate can be improved.

5. Volume Distribution Inside Web Equivalent Portion

The volume distribution inside each of the web equivalent portions performed in the second preforming step can be adjusted by changing the shape of the arm processing part as appropriate according to the shape of the forged crankshaft (final product). For example, by changing the width of the open side of the arm processing part or designing the arm processing part to have inclined surfaces, it is possible to change the volume of the arm equivalent portion, whereby the volume distribution inside the web equivalent portion can be adjusted.

The weights of the forged crankshaft (final product) may be any of various shapes. For example, there is a case where each of the weights bulges greatly in the width direction and has a small dimension in the pin decentering direction. In order to comply with such a case, the shape of the weight processing part may be changed such that the volume can be distributed inside the web equivalent portion appropriately in the width direction and in the pin decentering direction in the second preforming step. The change to the shape of the weight processing part may be adjusting the angle of inclination of the inclined surfaces or designing the weight processing part to have curved surfaces, for example. Further, each of the web equivalent portions may be pressed from the open side of the recessed web processing part for volume distribution inside the weight equivalent portion.

Figure 13A:
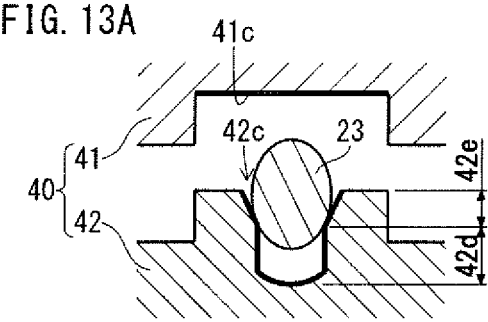
FIG. 13A is a cross-sectional view of a portion to be formed into an arm incorporating a weight before undergoing pressing to press the portion to be formed into an arm incorporating a weight from the open side of a recessed web processing portion.
Figure 13B:
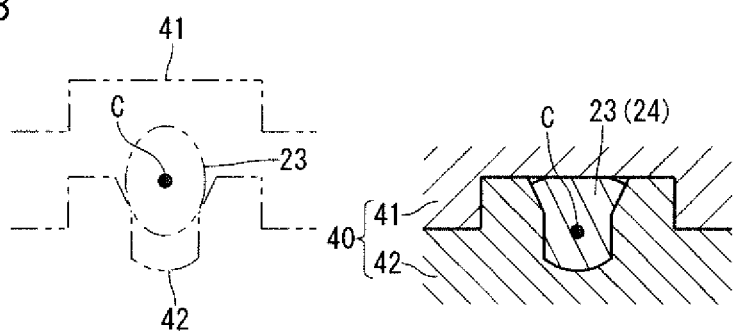
FIG. 13B is a cross-sectional view of the portion to be formed into an arm incorporating a weight at the completion of pressing to press the portion to be formed into an arm incorporating a weight is pressed from the open side of the recessed web processing portion.

FIGS. 13A and 13B are cross-sectional views of a portion to be formed into an arm incorporating a weight (web equivalent portion) in a case where the web equivalent portion is pressed from the open side of the recessed web processing part. FIG. 13A shows a state before pressing, and FIG. 13B shows a state at the completion of pressing. In the case shown in FIGS. 13A and 13B, the recessed web processing part shown in FIGS. 9A and 9B is modified to be shallower.

In the process flow shown in FIGS. 13A and 13B, as in the process flow shown in FIGS. 9A and 9B, each of the web equivalent portions is pushed to the bottom side of the recessed web processing part 42c and is deformed along the recessed web processing part 42c. Since the recessed web processing part 42c is shallower, at the last stage of the pressing by the first pair of dies, the flat web processing part 41c is pressed against the open side surface of the web equivalent portion. Accordingly, the web equivalent portion is pressed from the open side of the recessed web processing part 42c and is deformed to have a greater width and a smaller length (dimension in the decentering direction). Thus, the volume is distributed inside the weight equivalent portion.

The pressing of the web equivalent portion from the open side is preferably a light pressing so that the material can flow into the web equivalent portion without blockage. The light pressing can be performed, for example, by pressing a part of the open side surface 23b (see FIG. 9B) of the web equivalent portion. In this case, the material flows to a portion that is out of contact with the dies, thereby resulting in a light pressing.

6. Preferred Examples

In the intermediate blank obtained by the second preforming step, the ratio ($t_1/t_0$) of the thickness $t_1$ (mm) of each of the web equivalent portions (portions to be formed into arms and portions to be formed into weights integrated with the arms) to the finished size $t_0$ (mm) is desirably equal to or greater than 1.1, and more desirably equal to or greater than 1.5, with a view to improving the degree of filling of material in the weights in the after steps. If the ratio (t1/t0) is greater than 3.5, the bulging/deforming areas of the material surface will be too great, whereby the form accuracy of the outer peripheries of the arms may be decreased. Therefore, the ratio (t1/t0) is desirably not more than 3.5.

The ratio (Sw2/Sw0) of the sectional area Sw2 ($mm^2$) of each of the web equivalent portions of the intermediate blank to the sectional area Sw0 ($mm^2$) of each of the webs of the forged crankshaft (final product) is desirably 0.3 to 0.9, with a view to preventing deficiency in the weights while maintaining the degree of filling of material in the weights sufficiently high in the after steps. For the same purpose, the ratio (Sw1/Sw0) of the sectional area Sw1 ($mm^2$) of each of the web equivalent portions of the initial blank to the sectional area Sw0 ($mm^2$) of each of the webs of the forged crankshaft (final product) is desirably 0.2 to 0.8. The sectional area of a web equivalent portion means the total of the sectional area of a portion to be formed into an arm and the sectional area of a portion to be formed into a weight integrated with the arm. The sectional area of a web means the total of the sectional area of an arm and the sectional area of a weight integrated with the arm.

The ratio (Sj2/Sj0) of the sectional area Sj2 ($mm^2$) of each of the journal equivalent portions of the intermediate blank to the sectional area Sj0 ($mm^2$) of each of the journals of the forged crankshaft (final product) is desirably 1.0 to 1.9, with a view to diminishing flash formed in the after steps. For the same purpose, the ratio (Sj1/Sj0) of the sectional area Sj1 ($mm^2$) of each of the journal equivalent portions of the initial blank to the sectional area Sj0 ($mm^2$) of each of the journals of the forged crankshaft (final product) is desirably 1.2 to 1.9.

The ratio (Sp2/Sp0) of the sectional area Sp2 ($mm^2$) of each of the pin equivalent portions of the intermediate blank to the sectional area Sp0 ($mm^2$) of each of the pins of the forged crankshaft (final product) is desirably 0.7 to 1.9, with a view to diminishing flash formed in the after steps. For the same purpose, the ratio (Sp1/Sp0) of the sectional area Sp1 ($mm^2$) of each of the pin equivalent portions of the initial blank to the sectional area Sp0 ($mm^2$) of each of the pins of the forged crankshaft (final product) is desirably 0.9 to 1.9.

In the second preforming step, as described above, the upper portions of the first pin processing parts 41b and the upper portions of the first journal processing parts 41a serve as partitions that controls the flow of material in the axial direction. In order to strengthen this effect, it is important to decrease the widths of the open sides of the recessed first pin processing parts 41b and the widths of the open sides of the recessed first journal processing parts 41a (see Bp in FIG. 11A and Bj in FIG. 10A). However, if the widths Bp of the open sides of the recessed first pin processing parts and the widths Bj of the open sides of the recessed first journal processing parts are too narrow, the load in the after steps will be great.

For these reasons, in a case of employing a process flow as shown in FIGS. 8A to 11B, the ratio of the width Bp (mm) of the open side of each of the recessed first pin processing parts to the diameter Dp (mm) of each of the pins of the forged crankshaft (final product) is desirably 0.5 to 1.5. Also, the ratio of the width Bj (mm) of the open side of each of the recessed first journal processing parts to the diameter Dj (mm) of each of the journals of the forged crankshaft (final product) is desirably 0.5 to 1.5.

In the above-described process flow of the second preforming step, the initial blank 23 (the flat portions thereof) is pressed. During the pressing, the first journal processing parts 41a and the second journal processing parts 42a form closed cross-sections, and the first pin processing parts 41b and the second pin forming sections 42b form closed cross-sections. This prevents outflow of material and accordingly prevents formation of flash. In the forged crankshaft production method according to the present embodiment, partial pressing may be performed by the first journal processing parts 41a and the second journal processing parts 42a to prevent outflow of material and formation of flash. Also, partial pressing may be performed by the first pin processing parts 41b and the second pin processing parts 42b to prevent outflow of material and formation of flash.

Figure 14A:
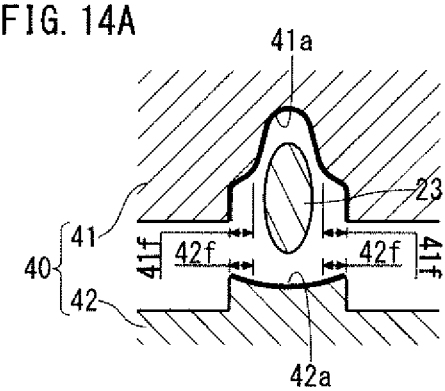
FIG. 14A is a cross-sectional view of a portion to be formed into a journal at the start of pressing in an exemplary process flow of the second preforming step to partly press the portion to be formed into a journal by a journal processing portion.
Figure 14B:
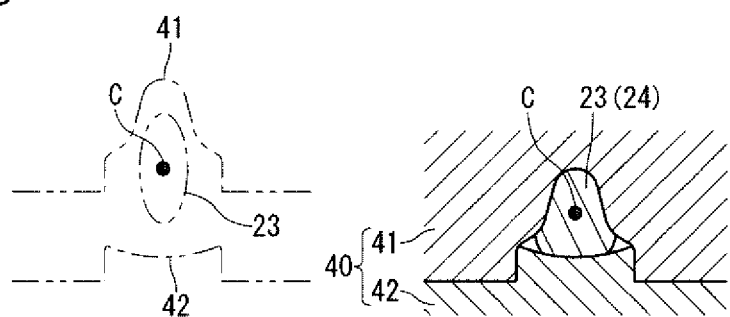
FIG. 14B is a cross-sectional view of the portion to be formed into a journal at the completion of pressing in the exemplary process flow of the second preforming step to partly press the portion to be formed into a journal by the journal processing portion.

FIGS. 14A and 14B are cross-sectional views of a portion to be formed into a journal showing an exemplary process flow to perform partial pressing by the journal processing parts in the second preforming step. FIG. 14A shows a state at the start of pressing, and FIG. 14B shows a state at the completion of pressing. FIGS. 14A and 14B show a modification of the journal processing parts 41a and 42a shown in FIGS. 10A and 10B. As indicated by the heavy lines in FIG. 14A, each of the journal processing parts provided in the upper die 41 is a recessed portion capable of entirely housing a flat portion of the initial blank, that is, the first journal processing part 41a. Each of the journal processing parts provided in the lower die 42 is arc-shaped, that is, the second journal processing part 42a, and the second journal processing part 42a is located on the edge surface of a raised portion. The journal processing parts 41a and 42a have clearances 41f and 42f at both sides in the width direction, and the clearances 41f and 42f project outward in the width direction.

By the pair of dies having these journal processing parts 41a and 42a, along with a downward movement of the upper die 41, the flat portions of the initial blank 23 are entirely housed in the first journal portions 41a. When the upper die 41 is moved further down, the first journal processing parts 41a contact the flat portions, and subsequently, the second journal processing parts 42a contact the flat portions. By the contacts, the flat portions are pressed, and the sectional areas thereof are decreased. At the time, the material flows in the axial direction, whereby the volume is distributed. In this regard, the material partly flows in the clearances 41f and 42f, but the clearances 41f and 42f are partly kept out of contact with the flat portions. Thus, the flat portions are partly pressed, and the material does not flow out, thereby resulting in formation of no flash.

It is possible to apply the structure to be described below with reference to FIGS. 15A and 15B to the journal processing portions, and the journal equivalent portions may be partly pressed by the journal processing portions having the structure for prevention of outflow of material and formation of flash. With a view to facilitating volume distribution, it is preferred that the flat portions are entirely pressed while the first journal processing parts 41a and the second journal processing parts 42a form closed cross-sections. With a view to preventing the material from flowing into the spaces between the upper die and the lower die, it is preferred that partial pressing is carried out by the first journal processing parts 41a and the second journal processing parts 42a.

Figure 15A:
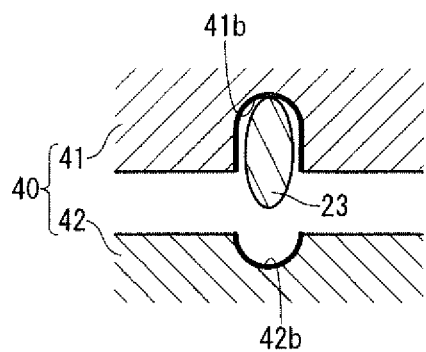
FIG. 15A is a cross-sectional view of a portion to be formed into a pin at the start of pressing in an exemplary process flow of the second preforming step to partly press the portion to be formed into a pin by a pin processing portion.
Figure 15B:
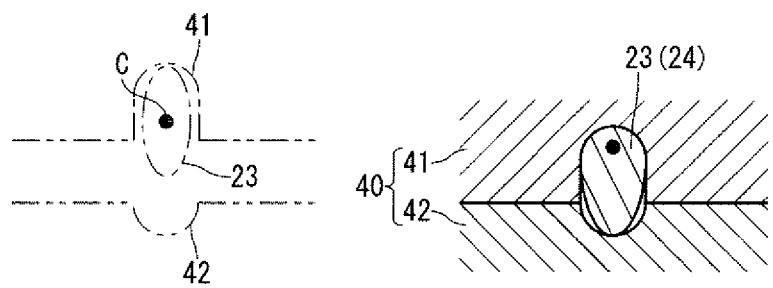
FIG. 15B is a cross-sectional view of the portion to be formed into a pin at the completion of pressing in the exemplary process flow of the second preforming step to partly press the portion to be formed into a pin by the pin processing portion.

FIGS. 15A and 15B are cross-sectional views of a portion to be formed into a pin showing an exemplary process flow to perform partial pressing by the pin processing portions in the secondary preforming step. FIG. 15A shows a state at the start of pressing, and FIG. 15B is a state at the completion of pressing. FIGS. 15A and 15B show a modification of the pin processing parts 41b and 42b shown in FIGS. 11A and 11B. As indicated by the heavy lines in FIG. 15A, each of the pin processing parts provided in the upper die 41 is a recessed portion capable of housing the most part of a flat portion of the initial blank 23, that is, the first pin processing part 41b. Each of the pin processing parts provided in the lower die 42 is arc-shaped, that is, the second pin processing part 42b, and the second pin processing part 42b is recessed. The depth of the first pin processing part 41b is greater than the depth of the second pin processing part 42b.

By the pair of dies having such pin processing parts 41b and 42b, along with a downward movement of the upper die 41, the flat portions of the initial blank 23 are mostly housed in the first pin processing parts 41b. When the upper die 41 is moved further down, the first pin processing parts 41b contact the flat portions, and subsequently, the second pin processing parts 42b contact the flat portions. At this time, regarding the first pin processing parts 41b and the second pin processing part 42b in each pair, both of the first and the second pin processing parts 41b and 42b contact part of a flat portion. In other words, the flat portion does not contact the pin equivalent portion near the parting faces. This allows the material to flow from the pin equivalent portions to the web equivalent portions without causing formation of flash. This also allows the pin equivalent portions to be decentered.

It is possible to apply the structure described above with reference to FIGS. 14A and 14B to the pin processing portions, and the pin equivalent portions may be partly pressed by the pin processing portions having the structure for prevention of outflow of material and formation of flash. With a view to facilitating volume distribution, it is preferred that the flat portions are entirely pressed while the first pin processing parts 41b and the second pin processing parts 42b form closed cross-sections. With a view to preventing the material from flowing into the spaces between the upper die and the lower die, it is preferred that partial pressing is carried out by the first pin processing parts 41b and the second pin processing parts 42b.

In the above-described process flow of the first preforming step, the entire circumference of a billet is pressed by the third pair of dies 30. During the pressing, the first journal processing parts 31a and the second journal processing parts 32a form closed cross-sections, and the first pin processing parts 31b and the second pin processing parts 32b form closed cross-sections. This prevents outflow of material and formation of flash. In the forged crankshaft production method according to the present embodiment, it is possible to prevent outflow of material and formation of flash by carrying out partial pressing of the journal equivalent portions by the journal processing portions. It is also possible to prevent outflow of material and formation of flash by carrying out partial pressing of the pin equivalent portions by the pin processing portions.

Figure 16A:
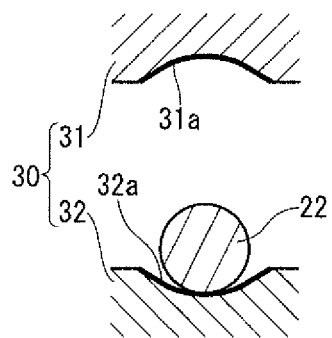
FIG. 16A is a cross-sectional view of a portion to be formed into a journal before undergoing pressing in an exemplary process flow of the first preforming step to partly press the portion to be formed into a journal by a journal processing portion.
Figure 16B:
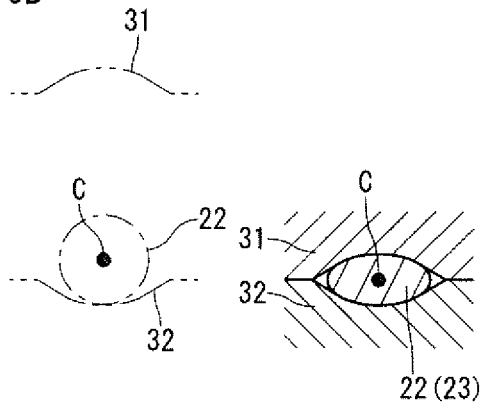
FIG. 16B is a cross-sectional view of the portion to be formed into a journal at the completion of pressing in the exemplary process flow of the first preforming step to partly press the portion to be formed into a journal by the journal processing portion.

FIGS. 16A and 16B are cross-sectional views of a portion to be formed into a journal showing an exemplary process flow to perform partial pressing by the journal processing portions in the first preforming step. FIG. 16A shows a state before pressing, and FIG. 16B shows a state at the completion of pressing. FIGS. 16A and 16B show a modification of the journal processing parts 31a and 32a shown in FIGS. 5A and 5B. As indicated by the heavy lines in FIG. 16A, the journal processing parts provided in the upper die 31 and the journal processing parts provided in the lower die 32 are recessed, and the journal processing parts have the same depth.

By the pair of dies having these journal processing portions, along with a downward movement of the upper die 31, the bottoms of the journal processing parts 31a provided in the upper die 31 and the journal processing parts 32a provided in the lower die 32 come into contact with the billet 22. When the upper die 31 is moved further down, the journal processing parts 31a provided in the upper die 31 and the journal processing parts 32a provided in the lower die 32 partly come into contact with the billet. In other words, the portions of the journal processing parts 31a and 32a around the parting faces do not contact the billet 22. Accordingly, it is possible to decrease the sectional areas, thereby forming flat portions, without forming flash. With a view to facilitating volume distribution, it is preferred that the billet is entirely pressed while the journal processing parts form closed cross-sections as shown in FIGS. 5A and 5B.

The pin processing portions provided in the third pair of dies may have a structure similar to the structure of the journal processing portions shown in FIGS. 16A and 16B though it is not shown in the drawings, and the pin processing portions may perform partial pressing of a billet. With a view to facilitating volume distribution, it is preferred that the billet is entirely pressed while the pin processing portions form closed cross-sections as shown in FIGS. 6A and 6B.

In the above-described process flow of the final preforming step shown in FIGS. 12A and 12B, either the pin die components 63 or the pin die components 73 are movable in the decentering direction relative to the plate 52 or 53 holding the components 63 or 73. In this case, the intermediate blank 24 is pressed by the upper die 60 and the lower die 70. Thereafter, along with the axial movements of the movable journal die components 62 and 72 and the pin die components 63 and 73, either the pin die components 63 of the upper die 60 or the pin die components 73 of the lower die 70 are relatively moved in the decentering direction. Thereby, the pin equivalent portions are decentered. In the forged crankshaft production method according to the present embodiment, the final preforming step is not limited to a step with this configuration.

Specifically, both of the pin die components 63 and 73 may be immovable relative to the plates 52 and 53. In this case, when the intermediate blank 24 is pressed by the upper die 60 and the lower die 70, the pin equivalent portions are pressed by the pin die components 63 of the upper die and the pin die components 73 of the lower die. Thereby, the pin equivalent portions are decentered and are formed into approximate shapes of the pins. With a view to improving the processing accuracy of the pins, it is preferred that, along with the pressing in the axial direction, either the pin die components 63 or the pin die components 73 are moved in the decentering direction for pressing of the pin equivalent portions to decenter the pin equivalent portions and to form the pin equivalent portions into approximate shapes of the pins.

In a crankshaft, the positions of the respective far ends of the pins vary depending on various factors. As shown in FIG. 1B, the far end PT of the pin P4 is the point of the pin P4 that is the farthest from the center of the journal J4. Specifically, the far end of a pin may be in the same position as the tip of the arm or may be in an inner position than the tip of the arm along the decentering direction. In either case, the forged crankshaft production method according to the present embodiment is applicable. As shown in FIG. 1B, the tip AT of the arm A7 is the point of the arm A7 (portion excluding the weight W7) that is the farthest from the center of the journal J4.

7. Front Part and Flange

Next, an exemplary process flow to process the portion to be formed into the front part (which will hereinafter be referred to as a "front equivalent portion") and the portion to be formed into the flange (which will hereinafter be referred to as a "flange equivalent portion") in the first preforming step employing the third pair of dies is described.

Figure 17A:
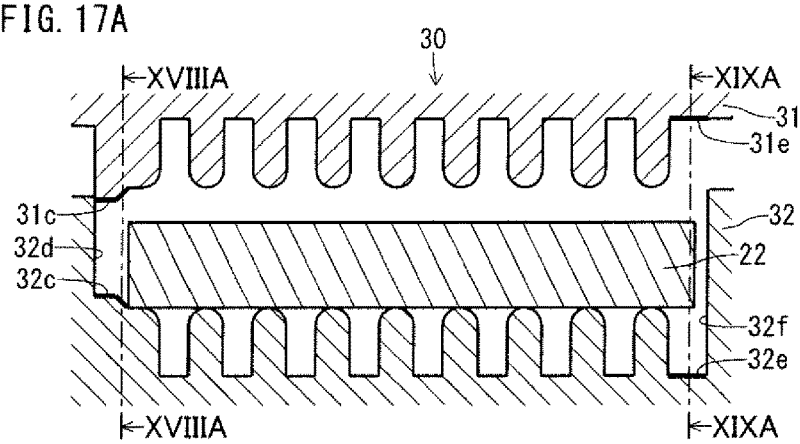
FIG. 17A is a longitudinal sectional view showing a state before pressing in an exemplary process flow of the first preforming step to process a portion to be formed into a front part and a portion to be formed into a flange.

FIGS. 17A to 19B are diagrams showing the exemplary process flow to process the front equivalent portion and the flange equivalent portion in the first preforming step. FIG. 17A is a longitudinal sectional view showing a state before pressing, and FIG. 17B is a longitudinal sectional view showing a state at the completion of pressing.

Figure 17B:
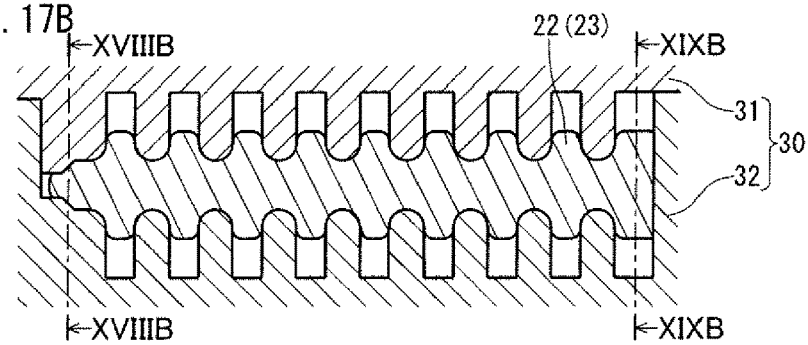
FIG. 17B is a longitudinal sectional view showing a state at the completion of pressing in the exemplary process flow of the first preforming step to process the portion to be formed into the front part and the portion to be formed into the flange.
Figure 18A:
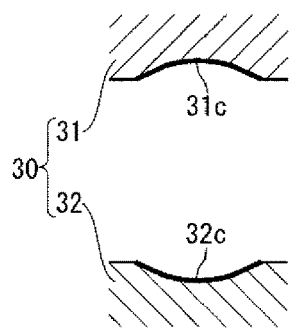
FIG. 18A is a cross-sectional view of the portion to be formed into the front part before undergoing pressing in the exemplary process flow of the first preforming step.
Figure 18B:
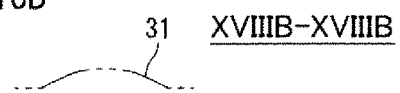
FIG. 18B is a cross-sectional view of the portion to be formed into the front part at the completion of pressing in the exemplary process flow of the first preforming step.
Figure 18B:
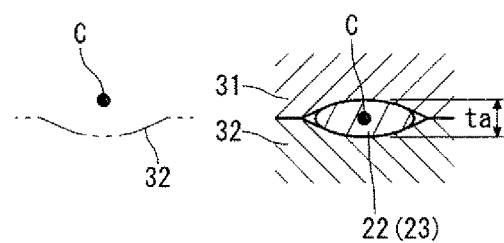

FIGS. 18A and 18B are cross-sectional views of the front equivalent part. FIG. 18A shows a state before pressing, and FIG. 18B shows a state at the completion of pressing. FIG. 18A is a sectional view along the line XVIIIA-XVIIIA in FIG. 17A, and FIG. 18B is a sectional view along the line XVIIIB-XVIIIB in FIG. 17B.

Figure 19A:
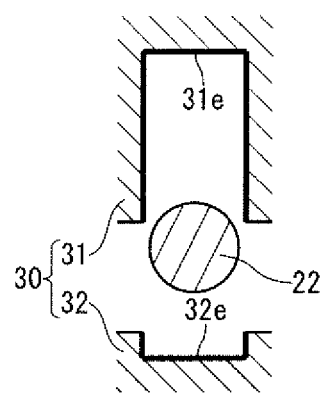
FIG. 19A is a cross-sectional view of the portion to be formed into the flange before undergoing pressing in the exemplary process flow of the first preforming step.
Figure 19B:
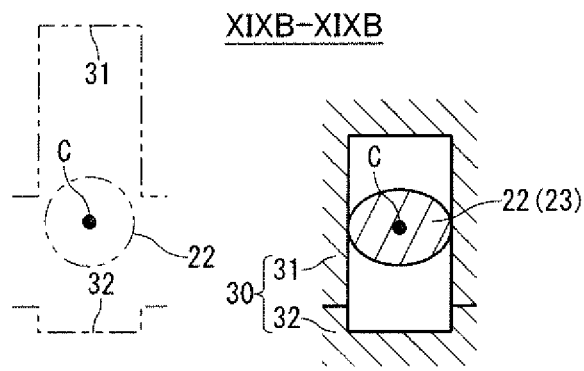
FIG. 19B is a cross-sectional view of the portion to be formed into the flange at the completion of pressing in the exemplary process flow of the first preforming step.

FIGS. 19A and 19B are cross-sectional views of the flange equivalent portion. FIG. 19A shows a state before pressing, and FIG. 19B shows a state at the completion of pressing. FIG. 19A is a sectional view along the line XIXA-XIXA in FIG. 17A, and FIG. 19B is a sectional view along the line XIXB-XIXB in FIG. 17B.

In FIGS. 17A to 19B, a billet 22 having a round cross-sectional shape, and a third pair of dies 30 composed of an upper die and a lower die are shown. For easy understanding of the drawings, in FIGS. 18B and 19B, the third upper die 31 and the third lower die 32 before pressing are indicated by two-dot chain lines, and the axis position C of the journal equivalent portion is indicated by a black circle. In FIG. 19B, the billet 22 is further indicated by a two-dot chain line. The third pair of dies 30 shown in FIGS. 17A to 19B includes pin processing portions and journal processing portions as the third pair of dies 30 shown in FIGS. 4A to 7B. The third pair of dies 30 further includes a front processing portion to come into contact with the front equivalent portion.

In this exemplary process flow, the front processing portion includes inner surfaces 31c and 32c as indicated by the heavy lines in FIGS. 17A and 18A, and an edge surface 32d as shown in FIG. 17A. The inner surfaces 31c and 32c of the front processing portion face the periphery of the front equivalent portion. The edge surface 32d of the front processing portion faces the end surface of the front equivalent portion. The cross-sectional shapes of the front processing part provided in the upper die 31 and the front processing part provided in the lower die 32 are both recessed, and the recessed parts have the same depth.

By the pair of dies including the front processing portion, along with a downward movement of the upper die 31, the bottoms of the front processing parts provided in the upper die 31 and the lower die 32 (in this exemplary process flow, the inner surfaces 31c and 32c) come into contact with the periphery of the front equivalent portion of the billet 22. When the upper die 31 is moved further down, both of the front processing parts (inner surfaces 31c and 32c) provided in the upper die 31 and the lower die 32 partly contact the periphery of the billet 22. In other words, the portions of the front processing parts (inner surfaces 31c and 32c) near the parting faces do not contact the periphery of the billet 22. Accordingly, it is possible to decrease the sectional area, thereby resulting in formation of a flat portion, without forming flash. Moreover, by elongating the front equivalent portion in the axial direction along with the formation of a flat portion, it is possible to distribute the volume in the axial direction. Thus, the material yield rate can be further improved.

The front processing portion of the third pair of dies 30 is not limited to the structure shown in FIGS. 18A and 18B for partial pressing of the periphery of the billet, and the front processing portion may have a structure similar to the structure of the journal processing portions shown in FIGS. 5A and 5B. In short, the front processing portion may include a first front processing part provided in one of the third dies and a second front processing part provided in the other of the third dies, and the first front processing part may be recessed and capable of housing the front equivalent portion of a billet. In this case, the front processing parts form a closed cross-section, and in the state, the entire front equivalent portion (the entire periphery of the front equivalent portion) of the billet is pressed. Thereby, the sectional area is decreased, and a flat portion can be formed with no flash formed. Moreover, by elongating the front equivalent portion in the axial direction along with the formation of a flat portion, it is possible to distribute the volume in the axial direction. Thus, the material yield rate can be further improved.

During the pressing in the first preforming step, when the end surface of the front equivalent portion entirely contacts the front processing part, the elongation of the front equivalent portion is stopped, and the material may partly flow out into the space. In order to prevent this outflow, it is preferred that the end surface of the front equivalent portion is prevented from contacting the front processing part (in this process flow, the edge surface 32d) during the pressing in the first preforming step. In other words, it is preferred that a space is made between the end surface of the front equivalent portion and the front processing part (edge surface 32d). Alternatively, the end surface of the front equivalent portion may partly contact the front processing part (edge surface 32d).

If the rate of decrease of the sectional area of the front equivalent portion during the first preforming step is set too high, fishtail will occur in the end portion, which may cause a defect in the after steps. The fishtail means that a recess is formed in the end portion of the front equivalent portion, whereby the end portion is formed into a fish tail shape. In order to prevent the fishtail, it is preferred that pressing is carried out in the first preforming step such that the thickness ta (dimension in the pressing direction) of the front equivalent portion of the initial blank 23 to be obtained thereby will decrease with decreasing distance from the end surface of the front equivalent portion. The thickness ta of the front equivalent portion can be decreased linearly, in a curve or in a staircase pattern, for example. In the case of FIG. 17B, the thickness ta of the front equivalent portion becomes thinner linearly in the part facing the journal (the opposite side from the end surface) and is constant in the side near the end surface. It is possible to adjust the thickness ta of the front equivalent portion by adjusting the shapes of the front processing parts provided in the third dies 30 (in this process flow, the inner surfaces 31c and 32c of the front processing portion) as appropriate.

When the front equivalent portion of the initial blank 23 is made such that the thickness ta thereof decreases with decreasing distance from the end surface of the front equivalent portion, the sectional area of the journal-facing side of the front equivalent portion is slightly greater than the sectional area of the end-surface side of the front equivalent portion. In this case, in the next second preforming step, the end-surface side of the front equivalent portion and the journal-facing side of the front equivalent portion can be pressed to have substantially the same sectional area with no flash formed. Thus, even when the front equivalent portion of the initial blank 23 is made such that the thickness ta thereof decreases with increasing distance from the end surface of the front equivalent portion, the material yield rate can be maintained high.

In this exemplary process flow, the flange processing portion includes inner surfaces 31e and 32e as indicated by the heavy lines in FIGS. 17A and 19A, and an edge surface 32f as shown in FIG. 17A. The inner surfaces 31e and 32e of the flange processing portion face the periphery of the flange equivalent portion. The edge surface 32f of the flange processing portion faces the end surface of the flange equivalent portion.

With a view to further improving the material yield rate, it is desired that the sectional area of the flange equivalent portion is increased in the first preforming step. For this purpose, it is preferred that the end surface of the flange equivalent portion is brought into contact with the flange processing part (in this exemplary flow, the edge surface 32O along with the pressing by the third pair of dies. In this case, while the sectional area of the journal equivalent portion connected to the flange equivalent portion is being decreased, whereby the journal equivalent portion is formed into a flat portion, the material flows into the flange equivalent portion. At this time, since the end surface of the flange equivalent portion is held by the flange processing part (edge surface 32O, the sectional area of the flange equivalent portion increases. Thus, the volume is distributed in the axial direction, and the material yield rate can be further improved.

In order to facilitate the increase of the sectional area of the flange equivalent portion, it is preferred that the periphery of the flange equivalent portion is prevented from contacting the third dies (in this process flow, the inner surfaces 31e and 32e) in the first preforming step. Alternatively, for adjustment of the shape (dimensions) of the flange equivalent portion, the periphery of the flange equivalent portion may partly contact the third dies (in this process flow, the inner surfaces 31e and 32e) (see FIGS. 19A and 19B).

At the start of pressing in the first preforming step, the end surface of the flange equivalent portion may be brought into contact with the flange processing part (in this process flow, the edge surface 32f). Alternatively, there may be a space between the end surface of the flange equivalent portion and the flange processing part (edge surface 32O at the start of pressing, and the end surface of the flange equivalent portion may be brought into contact with the flange processing part (edge surface 32O during the pressing. Either the former or the latter shall be selected depending on the outer diameter (sectional area) of the flange of the crankshaft.

Next, an exemplary process flow to process the front equivalent portion and the flange equivalent portion in the second preforming step is described.

Figure 20A:
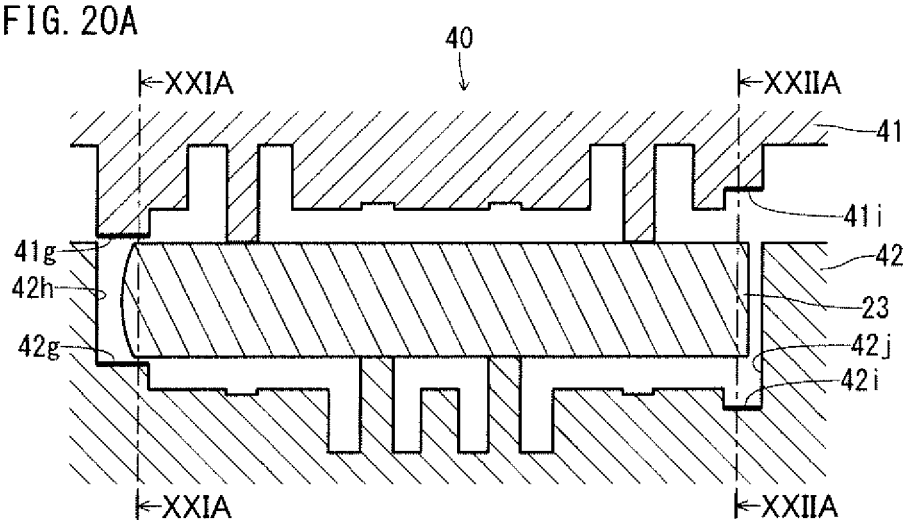
FIG. 20A is a longitudinal sectional view showing a state before pressing in an exemplary process flow of the second preforming step to process the portion to be formed into the front part and the portion to be formed into the flange.
Figure 20B:
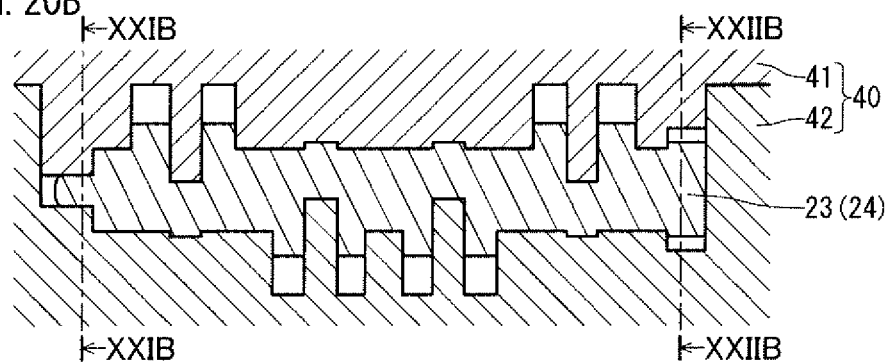
FIG. 20B is a longitudinal sectional view showing a state at the completion of pressing in the exemplary process flow of the second preforming step to process the portion to be formed into the front part and the portion to be formed into the flange.

FIGS. 20A to 22B are diagrams showing the exemplary process flow to process the front equivalent portion and the flange equivalent portion in the second preforming step. FIG. 20A is a cross-sectional view showing a state before pressing, and FIG. 20B is a cross-sectional view showing a state at the completion of pressing.

Figure 21A:
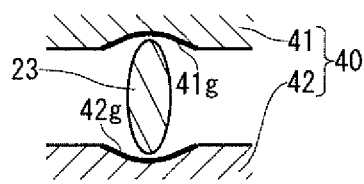
FIG. 21A is a cross-sectional view of the portion to be formed into the front part before undergoing pressing in the exemplary process flow of the second preforming step.
Figure 21B:
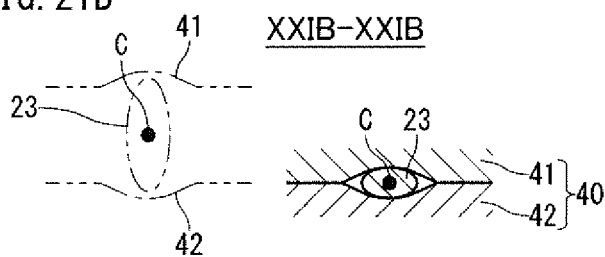
FIG. 21B is a cross-sectional view of the portion to be formed into the front part at the completion of pressing in the exemplary process flow of the second preforming step.

FIGS. 21A and 21B are cross-sectional views showing the front equivalent portion in the second preforming step. FIG. 21A shows a state before pressing, and FIG. 21B shows a state at the completion of pressing. FIG. 21A is a cross-sectional view along the line XXIA-XXIA in FIG. 20A, and FIG. 21B is a cross-sectional view along the line XXIB-XXIB in FIG. 20B.

FIGS. 22A and 22B are cross-sectional views of the flange equivalent portion in the second preforming step. FIG. 22A shows a state before pressing, and FIG. 22B shows a state at the completion of pressing. FIG. 22A is a cross-sectional view along the line XXIIA-XXIIA in FIG. 20A, and FIG. 22B is a cross-sectional view along the line XXIIB-XXIIB in FIG. 20B.

In FIGS. 20A to 22B, the initial blank 23 and a first pair of dies 40 are shown. For easy understanding of the drawings, in FIGS. 21B and 22B, the first upper die 41 and the first lower die 42 before pressing are indicated by two-dot chain lines, and the axis position C of the journal equivalent portion is indicated by a black circle. The first pair of dies 40 shown in FIGS. 20A to 22B includes web processing portions, pin processing portions and journal processing portions as the first pair of dies 40 shown in FIGS. 8A to 11B. The first pair of dies 40 further includes a front processing portion to come into contact with the front equivalent portion.

In this exemplary process flow, the front processing portion includes inner surfaces 41g and 42g as indicated by the heavy lines in FIGS. 20A and 21A, and an edge surface 42h as shown in FIG. 20A. The inner surfaces 41g and 42g of the front processing portion face the periphery of the front equivalent portion. The edge surface 42h of the front processing portion faces the end surface of the front equivalent portion. As indicated by the heavy lines in FIG. 21A, the cross-sectional shape of the front processing part provided in the upper die 41 and the cross-sectional shape of the front processing part provided in the lower die 42 are both recessed, and the recessed portions have the same depth.

By the pair of dies including the front processing portion, along with a downward movement of the upper die 41, the bottoms of the front processing parts provided in the upper die 41 and the lower die 42 (in this exemplary process flow, the inner surfaces 41g and 42g) come into contact with the periphery of the flat portion (front equivalent portion) of the initial blank 23. When the upper die 41 is moved further down, both of the front processing parts (inner surfaces 41g and 42g) provided in the upper die 41 and the lower die 42 partly contact the periphery of the front equivalent portion. In other words, the portions of the front processing parts (inner surfaces 41g and 42g) near the parting faces do not contact the periphery of the front equivalent portion. Accordingly, the sectional area of the front equivalent portion can be decreased by the pressing with no flash formed. Moreover, by elongating the front equivalent portion in the axial direction along with the decrease of the sectional area of the front equivalent portion, it is possible to distribute the volume in the axial direction. Thus, the material yield rate can be further improved.

The front processing portion of the first pair of dies 40 are not limited to the structure shown in FIGS. 21A and 21B for partial pressing of the periphery of the front equivalent portion, and the front processing portion may have a structure similar to the structure of the journal processing portions shown in FIGS. 10A and 10B. In short, the front processing portion may include a first front processing part provided in one of the first dies and a second front processing part provided in the other of the first dies, and the first front processing part may be recessed and capable of housing the front equivalent portion. In this case, the front processing parts form a closed cross-section, and in the state, the entire front equivalent portion (the entire periphery of the front equivalent portion) is pressed. This permits a decrease of the sectional area of the front equivalent portion without causing formation of flash. Moreover, by elongating the front equivalent portion in the axial direction along with the decrease of the sectional area of the front equivalent portion, it is possible to distribute the volume in the axial direction. Thus, the material yield rate can be further improved.

During the pressing in the second preforming step, when the end surface of the front equivalent portion entirely contacts the front processing portion, the elongation of the front equivalent portion is stopped, and the material may partly flow out. In order to prevent this outflow, it is preferred that the end surface of the front equivalent portion is prevented from contacting the front processing part (in this process flow, the edge surface 42h) during the pressing in the second preforming step. In other words, it is preferred that a space is made between the end surface of the front equivalent portion and the front processing part (edge surface 42h). Alternatively, the end surface of the front equivalent portion may partly contact the front processing part (edge surface 42h).

In this exemplary process flow, the flange processing portion includes inner surfaces 41i and 42i as indicated by the heavy lines in FIGS. 20A and 22A, and an edge surface 42j as shown in FIG. 20A. The inner surfaces 41i and 42i of the flange processing portion face the periphery of the flange equivalent portion. The edge surface 42j of the flange processing portion faces the end surface of the flange equivalent portion.

With a view to further improving the material yield rate, it is desired that the sectional area of the flange equivalent portion is increased in the second preforming step. For this purpose, it is preferred that the end surface of the flange equivalent portion is brought into contact with the flange processing part (in this exemplary flow, the edge surface 42j) along with the pressing of the flat portions. In this case, while the sectional area of the journal equivalent portion connected to the flange equivalent portion is being decreased by pressing of the journal equivalent portion, the material flows into the flange equivalent portion. At this time, since the end surface of the flange equivalent portion is held by the flange processing part (edge surface 42j), the sectional area of the flange equivalent portion increases. Thus, the volume is distributed in the axial direction, and the material yield rate can be further improved.

In order to facilitate the increase of the sectional area of the flange equivalent portion, it is preferred that the periphery of the flange equivalent portion is prevented from contacting the flange processing parts (in this process flow, the inner surfaces 41i and 42i) in the second preforming step. Alternatively, for adjustment of the shape (dimensions) of the flange equivalent portion, it is preferred that the periphery of the flange equivalent portion partly contacts the flange processing parts (in this process flow, the inner surfaces 41i and 42i) (see FIGS. 22A and 22B).

At the start of pressing in the second preforming step, the end surface of the flange equivalent portion may be brought into contact with the flange processing part (in this process flow, the edge surface 42j). Alternatively, there may be a space between the end surface of the flange equivalent portion and the flange processing part (edge surface 42j) at the start of pressing, and the end surface of the flange equivalent portion may be brought into contact with the flange processing part (edge surface 42j) during the pressing. Either the former or the latter shall be selected depending on the outer diameter (cross-sectional area) of the flange of the crankshaft.

INDUSTRIAL APPLICABILITY

The present invention is efficiently utilized in production of a forged crankshaft to be mounted in a reciprocating engine.

LIST OF REFERENCE SYMBOLS 11, 21: forged crankshaft
12, 22: billet
13: rolled blank
14: bent blank
15: rough forged blank
16, 26: finish forged blank
23: initial blank
23a: flat portion
23b: open-side surface of web equivalent portion
24: intermediate blank
25: final blank
30: third pair of dies
31: third upper die
31a: first journal processing part
31b: first pin processing part
31c: inner surface of front processing portion
31e: inner surface of flange processing portion
32: third lower die
32a: second journal processing part
32b: second pin processing part
32c: inner surface of front processing portion
32d: edge surface of front processing portion
32e: inner surface of flange processing portion
32f: edge surface of flange processing portion
40: first pair of dies
41: first upper die
41a: first journal processing part
41b: first pin processing part
41c: flat web processing part
41f clearance
41g: inner surface of front processing portion
41i: inner surface of flange processing portion
42: first lower die
42a: second journal processing part
42b: second pin processing part
42c: recessed web processing part
42d: arm processing part
42e: weight processing part
42f: clearance
42g: inner surface of front processing portion
42h: edge surface of front processing portion
42i: inner surface of flange processing portion
42j: edge surface of flange processing portion
51: second pair of dies
52: upper plate
53: lower plate
54: hydraulic cylinder
60: second upper die
61: fixed journal die component
62: movable journal die component
63: pin die component
70: second lower die
71: fixed journal die component
72: movable journal die component
73: pin die component
A, A1 to A8: crank arm
B: flash
J, J1 to J5: journal
P, P1 to P4: pin Fr: front part
Fl: flange
W, W1 to W8: counterweight

The invention claimed is:

1. A method for producing a forged crankshaft including journals serving as a center of rotation, pins decentered from the journals, crank arms connecting the journals and the pins, and counterweights integrated with some or all of the crank arms, the method comprising:
   a first preforming step of decreasing sectional areas of portions of a billet to be formed into the pins and cross-sectional areas of portions of the billet to be formed into the journals, thereby forming flat portions;
   a second preforming step of pressing an initial blank obtained by the first preforming step by a first pair of dies with a width direction of the flat portions set as a pressing direction to obtain an intermediate blank, in which portions to be formed into the crank arms incorporating the counterweights are thicker than a finished size, and portions to be formed into the counterweights integrated with the crank arms are thicker than a finished size;
   a final preforming step of pressing the portions of the intermediate blank to be formed into the crank arms incorporating the counterweights and the portions of the intermediate blank to be formed into the counterweights integrated with the crank arms from an axial direction of the intermediate blank and pressing the intermediate blank from a direction perpendicular to the axial direction of the intermediate blank to form the intermediate blank into a crankshaft shape, wherein:
   the first pair of dies includes web processing portions to come into contact with the portions to be formed into the crank arms incorporating the counterweights and the portions to be formed into the counterweights integrated with the crank arms, pin processing portions to come into contact with the portions to be formed into the pins, and journal processing portions to come into contact with the portions to be formed into the journals;
   each of the web processing portions provided in one of the first pair of dies includes an arm processing part to come into contact with a portion to be formed into the crank arm and a weight processing part to come into contact with a portion to be formed into the counterweight;
   the arm processing part and the weight processing part form a recessed portion, where the arm processing part is located in a bottom side of the recessed portion and the weight processing part is located in an open side of the recessed portion;
   a width of an open side of the weight processing part becomes greater with increasing distance from the bottom of the recessed portion;
   in the second preforming step, the pin processing portions and the journal processing portions press the flat portions; and
   while the flat portions are pressed, the portions to be formed into the crank arms incorporating the counterweights and the portions to be formed into the counterweights integrated with the crank arms are pushed into the bottom sides of the web processing portions and are deformed.

2. The method for producing a forged crankshaft according to claim 1, wherein
   the forged crankshaft further includes a flange located at a rear end in the axial direction;
   the first pair of dies further includes a flange processing portion to come into contact with a portion to be formed into the flange; and
   in the second preforming step, while the flat portions are pressed, an end surface of the portion to be formed into the flange is brought into contact with the flange processing portion, whereby a sectional area of the portion to be formed into the flange is increased.

3. The method for producing a forged crankshaft according to claim 1, wherein:
   the forged crankshaft further includes a front part located at a front end in the axial direction;
   in the first preforming step, further, a sectional area of a portion of the billet to be formed into the front part is decreased, whereby the portion to be formed into the front part is formed into a flat portion;
   the first pair of dies further includes a front processing portion to come into contact with the portion to be formed into the front part; and
   in the second preforming step, the portion to be formed into the front part is pressed and elongated by the front processing portion.

4. The method for producing a forged crankshaft according to claim 3, wherein
   the forged crankshaft further includes a flange located at a rear end in the axial direction;
   the first pair of dies further includes a flange processing portion to come into contact with a portion to be formed into the flange; and
   in the second preforming step, while the flat portions are reduced, an end surface of the portion to be formed into the flange is brought into contact with the flange processing portion, whereby a sectional area of the portion to be formed into the flange is increased.

5. The method for producing a forged crankshaft according to claim 1, wherein
   when the portions to be formed into the crank arms incorporating the counterweights and the portions to be formed into the counterweights integrated with the crank arms are pushed into the bottom sides of the web processing portions and are deformed, the portions to be formed into the crank arms incorporating the counterweights and the portions to be formed into the counterweights integrated with the crank arms are pressed from the open sides of the recessed web processing portions, whereby volume is distributed.

6. The method for producing a forged crankshaft according to claim 5, wherein
   the forged crankshaft further includes a flange located at a rear end in the axial direction;
   the first pair of dies further includes a flange processing portion to come into contact with a portion to be formed into the flange; and
   in the second preforming step, while the flat portions are reduced, an end surface of the portion to be formed into the flange is brought into contact with the flange processing portion, whereby a sectional area of the portion to be formed into the flange is increased.

7. The method for producing a forged crankshaft according to claim 5, wherein:
   the forged crankshaft further includes a front part located at a front end in the axial direction;
   in the first preforming step, further, a sectional area of a portion of the billet to be formed into the front part is decreased, whereby the portion to be formed into the front part is formed into a flat portion;

the first pair of dies further includes a front processing portion to come into contact with the portion to be formed into the front part; and in the second preforming step, the portion to be formed into the front part is reduced and elongated by the front processing portion.

8. The method for producing a forged crankshaft according to claim 7, wherein the forged crankshaft further includes a flange located at a rear end in the axial direction;

the first pair of dies further includes a flange processing portion to come into contact with a portion to be formed into the flange; and in the second preforming step, while the flat portions are reduced, an end surface of the portion to be formed into the flange is brought into contact with the flange processing portion, whereby a sectional area of the portion to be formed into the flange is increased.

* * * * *